US011096186B2

(12) United States Patent
Wang et al.

(10) Patent No.: US 11,096,186 B2
(45) Date of Patent: Aug. 17, 2021

(54) MODULATION AND CODING SCHEME TABLE DESIGN FOR POWER EFFICIENCY

(71) Applicant: QUALCOMM Incorporated, San Diego, CA (US)

(72) Inventors: Ying Wang, San Diego, CA (US); Jing Jiang, San Diego, CA (US); Joseph Binamira Soriaga, San Diego, CA (US); Gabi Sarkis, San Diego, CA (US); Peter Pui Lok Ang, San Diego, CA (US); Jing Lei, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/565,167

(22) Filed: Sep. 9, 2019

(65) Prior Publication Data
US 2020/0084778 A1    Mar. 12, 2020

Related U.S. Application Data

(60) Provisional application No. 62/729,858, filed on Sep. 11, 2018.

(51) Int. Cl.
*H04B 7/06* (2006.01)
*H04W 72/10* (2009.01)
(Continued)

(52) U.S. Cl.
CPC .......... *H04W 72/10* (2013.01); *H04B 7/0452* (2013.01); *H04B 7/063* (2013.01);
(Continued)

(58) Field of Classification Search
CPC ..... H04L 1/0003; H04L 1/001; H04B 7/0626; H04B 7/0413; H04B 7/063; H04B 7/0639
(Continued)

(56) References Cited

U.S. PATENT DOCUMENTS

2013/0258874 A1* 10/2013 Khoshnevis .......... H04L 1/0031
  370/252
2013/0343252 A1* 12/2013 Chakraborty ..... H04W 52/0261
  370/311
(Continued)

FOREIGN PATENT DOCUMENTS

EP         1845742 A1    10/2007
EP         2787670 A1    10/2014
WO    WO-2015103630 A1   7/2015

OTHER PUBLICATIONS

International Search Report and Written Opinion—PCT/US2019/050375—ISA/EPO—dated Dec. 19, 2019.

*Primary Examiner* — Emmanuel Bayard
(74) *Attorney, Agent, or Firm* — Holland & Hart LLP

(57) ABSTRACT

Methods, systems, and devices for wireless communications are described. A user equipment (UE) may be configured to determine a priority indicator for an upcoming transmission between the UE and a base station and transmit the priority indicator to the base station. The base station may receive the priority indicator, determine a network condition, and may transmit control information for a downlink transmission. The control information may include an indication of a set of modulation and coding schemes to select from a plurality of sets of modulation and coding schemes and an index value for an entry in the selected set of modulation and coding scheme, where the indication is based on the priority indicator and a network condition. The UE may identify a combination of a modulation order and a code rate for the downlink transmission based on the indication of modulation and coding scheme table and the index value.

29 Claims, 16 Drawing Sheets

(51) Int. Cl.
*H04L 1/00* (2006.01)
*H04B 7/0452* (2017.01)
*H04W 72/04* (2009.01)

(52) U.S. Cl.
CPC ......... *H04B 7/0626* (2013.01); *H04B 7/0639* (2013.01); *H04L 1/001* (2013.01); *H04L 1/0003* (2013.01); *H04W 72/0473* (2013.01)

(58) Field of Classification Search
USPC ....... 375/219–220, 267, 299, 347, 349, 356, 375/358
See application file for complete search history.

(56) References Cited

U.S. PATENT DOCUMENTS

| | | | |
|---|---|---|---|
| 2014/0018085 A1* | 1/2014 | Young | H04W 76/27 455/450 |
| 2015/0016553 A1* | 1/2015 | Yang | H04L 1/1812 375/261 |
| 2015/0131537 A1* | 5/2015 | Chiang | H04L 5/0076 370/329 |
| 2015/0195818 A1 | 7/2015 | Davydov et al. | |
| 2016/0073284 A1* | 3/2016 | Qian | H04W 52/0251 370/241 |
| 2016/0094310 A1* | 3/2016 | Xia | H04L 5/0057 370/329 |
| 2016/0119873 A1* | 4/2016 | Dai | H04W 52/0222 370/311 |
| 2016/0135169 A1* | 5/2016 | Eriksson Lowenmark | H04W 4/70 455/452.1 |
| 2016/0249405 A1* | 8/2016 | Koc | H04L 27/2607 |
| 2017/0034845 A1 | 2/2017 | Liu et al. | |
| 2017/0085355 A1* | 3/2017 | Hayashi | H04L 5/1469 |
| 2017/0366377 A1* | 12/2017 | Papasakellariou | H04L 5/005 |
| 2018/0167931 A1* | 6/2018 | Papasakellariou | H04W 72/0413 |
| 2018/0255505 A1* | 9/2018 | Thyagarajan | H04J 11/0069 |
| 2019/0021095 A1* | 1/2019 | Xi | H04W 72/1242 |
| 2019/0190747 A1* | 6/2019 | Park | H04W 52/32 |
| 2019/0215133 A1* | 7/2019 | Pan | H04W 72/0446 |
| 2019/0364541 A1* | 11/2019 | Ryu | H04W 72/02 |

* cited by examiner ions, and more specifically to modulation and coding scheme table design in wireless communications systems.

MODULATION AND CODING SCHEME TABLE DESIGN FOR POWER EFFICIENCY

CROSS REFERENCE

The present Application for Patent claims the benefit of U.S. Provisional Patent Application No. 62/729,858 by WANG et al., entitled "MODULATION AND CODING SCHEME TABLE DESIGN FOR POWER EFFICIENCY," filed Sep. 11, 2018, assigned to the assignee hereof, and expressly incorporated herein.

INTRODUCTION

The following relates generally to wireless communications, and more specifically to modulation and coding scheme table design in wireless communications systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, wireless communications systems may use different modulation schemes for wireless transmissions, such as binary phase shift keying (BPSK), quadrature phase shift keying (QPSK), 16 quadrature amplitude modulation (QAM), or 64 QAM, for example. Different coding schemes may be used in conjunction with different modulation schemes to enhance the likelihood of successful reception of transmissions. In some cases, a UE may measure channel conditions and provide a channel quality indication (CQI) report to a base station, which the base station may use to select a modulation and coding scheme for subsequent communications with the UE. Enhanced flexibility for maximizing power efficiency may help to enhance efficiency of a wireless communications system.

SUMMARY

A method of wireless communication at a UE is described. The method may include determining a priority indicator for an upcoming transmission between the UE and a base station. The method may include transmitting the priority indicator to the base station and receiving control information for a downlink transmission. In some cases, the control information may be received from the base station. In some examples, the control information may include an indication of a set of modulation and coding schemes to select from multiple sets of modulation and coding schemes and an index value for an entry in the selected set of modulation and coding scheme. In some cases, the indication may be based on the priority indicator and a network condition. The method may further include identifying a combination of a modulation order and a code rate for the downlink transmission based on the index value.

An apparatus for wireless communication at a UE is described. The apparatus may include a processor, memory coupled to the processor, and instructions stored in the memory. The instructions may be executable by the processor to cause the apparatus to determine a priority indicator for an upcoming transmission between the UE and a base station. The instructions may be executable by the processor to cause the apparatus to transmit the priority indicator to the base station and receive control information for a downlink transmission. In some cases, the control information may be received from the base station. In some examples, the control information may include an indication of a set of modulation and coding schemes to select from multiple sets of modulation and coding schemes and an index value for an entry in the selected set of modulation and coding scheme. In some examples, the indication may be based on the priority indicator and a network condition. The instructions may be executable by the processor to cause the apparatus to identify a combination of a modulation order and a code rate for the downlink transmission based on the index value.

Another apparatus for wireless communication at a UE is described. The apparatus may include means for determining a priority indicator for an upcoming transmission between the UE and a base station. The apparatus may include means for transmitting the priority indicator to the base station and receiving control information for a downlink transmission. For example, the control information may be received from the base station. In some examples, the control information may include an indication of a set of modulation and coding schemes to select from multiple sets of modulation and coding schemes and an index value for an entry in the selected set of modulation and coding scheme. In some examples, the indication may be based on the priority indicator and a network condition. The apparatus may include means for identifying a combination of a modulation order and a code rate for the downlink transmission based on the index value.

A non-transitory computer-readable medium storing code for wireless communication at a UE is described. The code may include instructions executable by a processor to determine a priority indicator for an upcoming transmission between the UE and a base station. The code may include instructions executable by a processor to transmit the priority indicator to the base station and receive, from the base station, control information for a downlink transmission. In some examples, the control information may include an indication of a set of modulation and coding schemes to select from multiple sets of modulation and coding schemes and an index value for an entry in the selected set of modulation and coding scheme. In some examples, the indication may be based on the priority indicator and a network condition. The code may include instructions executable by a processor to identify a combination of a modulation order and a code rate for the downlink transmission based on the index value.

In some examples of the method, apparatuses, and non-transitory computer-readable medium described herein, the priority indicator includes an indication of power efficiency prioritization or an indication of spectral efficiency prioritization or a combination thereof. In some examples of the method, apparatuses, and non-transitory computer-readable medium described herein, transmitting the priority indicator may include operations, features, means, or instructions for identifying a channel quality indicator value included in a set of channel quality indicators. In some cases, the set of channel quality indicators may include combinations of modulation orders and code rates for a transmission between the UE and a base station. In some examples of the method, apparatuses, and non-transitory computer-readable medium described herein, transmitting the priority indicator may include operations, features, means, or instructions for determining a bandwidth associated with the transmission between the UE and the base station and transmitting a channel state information (CSI) to the base station. In some cases, the CSI may include the identified channel quality indicator value, the priority indicator, and the bandwidth associated with the transmission between the UE and the base station.

In some examples of the method, apparatuses, and non-transitory computer-readable medium described herein, transmitting the priority indicator further may include operations, features, means, or instructions for determining at least one of a number of antennas included in the UE, a rank value associated with the UE, a pre-coding matrix indicator (PMI) associated with the UE, a multi-user multiple-input multiple-output (MU-MIMO) capability of the UE, a traffic type supported by the UE, or a combination thereof. In some examples, the method, apparatuses, and non-transitory computer-readable medium described herein, may further include operations, features, means, or instructions for transmitting a CSI to the base station. In some cases, the CSI may include at least one of the priority indicator, the number of antennas, the rank value, the PMI, the MU-MIMO capability of the UE, the traffic type, or a combination thereof.

In some examples of the method, apparatuses, and non-transitory computer-readable medium described herein, the index value identifies the entry from a set of available entries of the selected set of modulation and coding schemes. In some examples of the method, apparatuses, and non-transitory computer-readable medium described herein, the network condition indicates whether a network associated with the UE and the base station may be heavily loaded or lightly loaded.

Some examples of the method, apparatuses, and non-transitory computer-readable medium described herein may further include operations, features, means, or instructions for receiving the downlink transmission from the base station and decoding the downlink transmission based on the identified combination of the modulation order and the code rate.

Some examples of the method, apparatuses, and non-transitory computer-readable medium described herein may further include operations, features, means, or instructions for determining a channel quality for a transmission between the UE and the base station, and requesting a modulation order and a coding scheme using a channel quality indicator value. In some examples of the method, apparatuses, and non-transitory computer-readable medium described herein, the requested modulation order and coding scheme being based on the channel quality and processing the control information to determine the modulation order, the code rate, or both from the base station.

In some examples of the method, apparatuses, and non-transitory computer-readable medium described herein, the modulation order includes at least of a QPSK modulation, a 16 QAM, a 64 QAM, or a combination thereof. In some examples, a first set of modulation and coding schemes in the sets of modulation and coding schemes may be configured to maximize power efficiency and a second set of modulation and coding schemes in the sets of modulation and coding schemes may be configured to maximize spectral efficiency.

In some examples of the method, apparatuses, and non-transitory computer-readable medium described herein, the first set of modulation and coding schemes includes more entries with high modulation order and low coding rate than the second set of modulation and coding schemes. Some examples of the method, apparatuses, and non-transitory computer-readable medium described herein may further include operations, features, means, or instructions for receiving a downlink control indicator (DCI) from the base station and identifying the index value for the entry in the selected set of modulation and coding schemes based on a bit included in the DCI.

Some examples of the method, apparatuses, and non-transitory computer-readable medium described herein may further include operations, features, means, or instructions for transmitting a radio resource control (RRC) connection setup request to the base station and receiving an RRC connection setup response from the base station. The method, apparatuses, and non-transitory computer-readable medium described herein may further include operations, features, means, or instructions for identifying the index value for the entry in the selected set of modulation and coding schemes based on the RRC connection setup response.

Some examples of the method, apparatuses, and non-transitory computer-readable medium described herein may further include operations, features, means, or instructions for receiving a radio network temporary identifier (RNTI) from the base station and identifying the index value for the entry in the selected set of modulation and coding schemes. In some cases, the index value may be identified based on the received RNTI.

A method of wireless communication at a base station is described. The method may include receiving from a UE, a priority indicator for a transmission between the UE and the base station. The method may include determining a network condition associated with an upcoming transmission between the UE and the base station. The method may include transmitting, to the UE, control information for a downlink transmission. In some cases, the control information may include an indication of a set of modulation and coding schemes for the UE to use from multiple sets of modulation and coding schemes and an index value for an entry in the selected set of modulation and coding schemes. In some cases, the indication may be based on the priority indicator and a network condition. The method may include transmitting the downlink transmission to the UE using a modulation order and a code rate associated with the index value for the entry in the selected set of modulation and coding schemes.

An apparatus for wireless communication at a base station is described. The apparatus may include a processor, memory coupled to the processor, and instructions stored in the memory. The instructions may be executable by the processor to cause the apparatus to receive from a UE, a priority indicator for a transmission between the UE and the base station. The instructions may be executable by the processor to cause the apparatus to determine a network condition associated with an upcoming transmission between the UE and the base station. The instructions may be executable by the processor to cause the apparatus to transmit, to the UE, control information for a downlink transmission. In some cases, the control information may include an indication of a set of modulation and coding schemes for the UE to use from multiple sets of modulation and coding schemes and an index value for an entry in the selected set of modulation and coding schemes. In some cases, the indication may be based on the priority indicator and a network condition. The instructions may be executable by the processor to cause the apparatus to transmit the downlink transmission to the UE using a modulation order and a code rate associated with the index value for the entry in the selected set of modulation and coding schemes.

Another apparatus for wireless communication at a base station is described. The apparatus may include means for receiving from a UE, a priority indicator for a transmission between the UE and the base station. The apparatus may include means for determining a network condition associated with an upcoming transmission between the UE and the base station. The apparatus may include means for transmitting, to the UE, control information for a downlink transmission. In some cases, the control information may include an indication of a set of modulation and coding schemes for the UE to use from multiple sets of modulation and coding schemes and an index value for an entry in the selected set of modulation and coding schemes. In some cases, the indication may be based on the priority indicator and a network condition. The apparatus may include means for transmitting the downlink transmission to the UE using a modulation order and a code rate associated with the index value for the entry in the selected set of modulation and coding schemes.

A non-transitory computer-readable medium storing code for wireless communication at a base station is described. The code may include instructions executable by a processor to receive from a UE, a priority indicator for a transmission between the UE and the base station. The code may include instructions executable by a processor to determine a network condition associated with an upcoming transmission between the UE and the base station. The code may include instructions executable by a processor to transmit, to the UE, control information for a downlink transmission. In some cases, the control information may include an indication of a set of modulation and coding schemes for the UE to use from multiple sets of modulation and coding schemes and an index value for an entry in the selected set of modulation and coding schemes. In some cases, the indication is based on the priority indicator and a network condition. The code may include instructions executable by a processor to and transmit the downlink transmission to the UE using a modulation order and a code rate associated with the index value for the entry in the selected set of modulation and coding schemes.

In some examples of the method, apparatuses, and non-transitory computer-readable medium described herein, the priority indicator includes an indication of power efficiency prioritization or an indication of spectral efficiency prioritization. In some examples of the method, apparatuses, and non-transitory computer-readable medium described herein, receiving the priority indicator may include operations, features, means, or instructions for receiving a channel quality indicator value from the UE, the channel quality indicator value being included in a set of channel quality indicators that includes combinations of modulation orders and code rates for a transmission between the UE and the base station. In some examples of the method, apparatuses, and non-transitory computer-readable medium described herein, receiving the priority indicator may include operations, features, means, or instructions for receiving a CSI from the UE, the CSI including the identified channel quality indicator value, the priority indicator, and a bandwidth associated with the transmission between the UE and the base station.

In some examples of the method, apparatuses, and non-transitory computer-readable medium described herein, receiving the priority indicator further may include operations, features, means, or instructions for receiving a CSI from the UE. In some cases, the CSI may include at least one of a channel quality indicator value, the priority indicator, a number of antennas included in the UE, a rank value associated with the UE, a PMI associated with the UE, a MU-MIMO capability of the UE and a traffic type supported by the UE.

In some examples of the method, apparatuses, and non-transitory computer-readable medium described herein, the index value identifies the entry from a set of available entries of the selected set of modulation and coding schemes. In some examples of the method, apparatuses, and non-transitory computer-readable medium described herein, the network condition indicates whether a network associated with the UE and the base station may be heavily loaded or lightly loaded.

Some examples of the method, apparatuses, and non-transitory computer-readable medium described herein may further include operations, features, means, or instructions for receiving a request for a modulation order and a coding scheme from the UE. In some cases, the requested modulation order and coding scheme may be based on a channel quality associated with the UE. Some examples of the method, apparatuses, and non-transitory computer-readable medium described herein may further include operations, features, means, or instructions for determining that a network associated with the UE and the base station may be heavily loaded. In some cases, the transmitted modulation order may be greater than the requested modulation order and the transmitted code rate may be less than the requested code rate.

In some examples of the method, apparatuses, and non-transitory computer-readable medium described herein, the modulation order includes at least one of a QPSK modulation, a 16 QAM, and a 64 QAM. Some examples of the method, apparatuses, and non-transitory computer-readable medium described herein may further include operations, features, means, or instructions for selecting the set of modulation and coding schemes from multiple sets of modulation and coding schemes based on the priority indicator.

In some examples of the method, apparatuses, and non-transitory computer-readable medium described herein, a first set of modulation and coding schemes in the sets of modulation and coding schemes may be configured to maximize power efficiency and a second set of modulation and coding schemes in the sets of modulation and coding schemes may be configured to maximize spectral efficiency. In some examples of the method, apparatuses, and non-transitory computer-readable medium described herein, the first set of modulation and coding schemes includes more entries with high modulation order and low coding rate than the second set of modulation and coding schemes.

Some examples of the method, apparatuses, and non-transitory computer-readable medium described herein may further include operations, features, means, or instructions for determining that a network associated with the UE and the base station may be lightly loaded and that the priority indicator includes an indication of power efficiency prioritization. In some cases, the method, apparatuses, and non-transitory computer-readable medium described herein may further include operations, features, means, or instructions for selecting the first set of modulation and coding schemes that may be configured to maximize power efficiency based on the determining.

Some examples of the method, apparatuses, and non-transitory computer-readable medium described herein may further include operations, features, means, or instructions for determining that a network associated with the UE and the base station may be heavily loaded and that the priority indicator includes an indication of power efficiency prioritization. In some cases, the method, apparatuses, and non-transitory computer-readable medium described herein may further include operations, features, means, or instructions for selecting the second set of modulation and coding schemes that may be configured to maximize spectral efficiency based on the determining.

Some examples of the method, apparatuses, and non-transitory computer-readable medium described herein may further include operations, features, means, or instructions for transmitting a DCI to the UE. In some cases, the DCI may include a bit identifying the index value for the entry in the selected set of modulation and coding schemes. Some examples of the method, apparatuses, and non-transitory computer-readable medium described herein may further include operations, features, means, or instructions for receiving an RRC connection setup request from the UE and transmitting an RRC connection setup response identifying the index value for the entry in the selected set of modulation and coding schemes to the UE. Some examples of the method, apparatuses, and non-transitory computer-readable medium described herein may further include operations, features, means, or instructions for transmitting an RNTI identifying the index value for the entry in the selected set of modulation and coding schemes to the UE.

DETAILED DESCRIPTION

Figure 1:
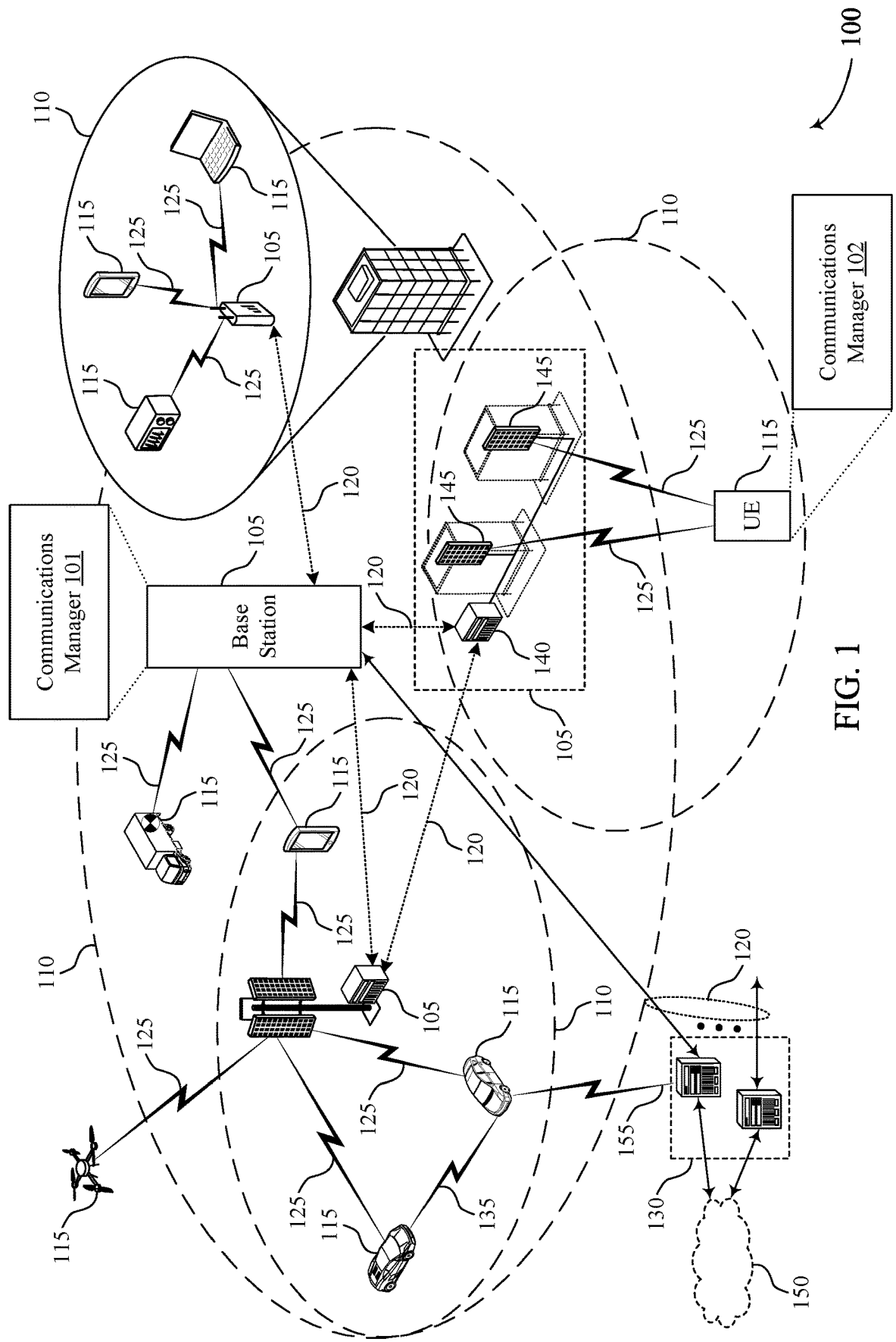
FIG. 1 illustrates an example of a wireless communications system that supports modulation and coding scheme table design for power efficiency in accordance with one or more aspects of the present disclosure.

Various aspects of the present disclosure provide for selecting one or more CQI tables, and modulation and coding scheme tables based on a priority indicator and a network condition. Existing wireless communications systems provide for maximizing spectral efficiencies in communications between the base station and a UE. In some cases, a UE may determine a priority indicator for an upcoming transmission between the UE and a base station. For example, the priority indicator may indicate whether the UE prioritizes power efficiency or spectral efficiency or a combination. For instance, the UE may report different CSI when prioritizing power efficiency over spectral efficiency. Additionally or alternatively, the UE may use the priority indicator to balance spectral efficiency with power-efficiency.

In some cases, a base station may determine a network condition associated with an upcoming transmission between the UE and the base station. For example, the base station may determine whether the network is lightly loaded or heavily loaded. In some cases, the UE may indicate that the UE prioritizes power efficiency. Upon receiving the indication, the base station may determine a load of the network. In some examples, if the network is lightly loaded, the base station may select an entry in a modulation and coding scheme table that includes a high code rate and low modulation order. This may result in power efficiency at the UE. Alternatively, if the base station determines that the network is heavily loaded, the base station may determine an entry in a modulation and coding scheme table that supports spectral efficiency instead of power efficiency. In some cases, a first modulation and coding scheme table may be designed to support power efficiency and a second modulation and coding scheme table may be designed to support spectral efficiency. In some cases, the base station may indicate the first modulation and coding scheme table to the UE if the network is lightly loaded and the UE prioritizes power efficiency. Alternatively, the base station may indicate the second modulation and coding scheme table to the UE. More specifically, if the base station determines that the network is heavily loaded and the UE prioritizes power efficiency, then the base station may indicate the second modulation and coding scheme table to the UE. Techniques of the present disclosure provides for a base station to select a modulation and coding scheme based on a network condition and a priority indicator associated with a UE. Such techniques may provide enhanced flexibility for UEs and base stations to efficiently communicate when a network is lightly loaded or when the network is heavily loaded.

Aspects of the disclosure are initially described in the context of a wireless communications system and examples of modulation and coding scheme tables. Aspects of the disclosure are further illustrated by and described with reference to apparatus diagrams, system diagrams, and flowcharts that relate to rate matching and semi persistent scheduling configuration in wireless communications.

FIG. 1 illustrates an example of a wireless communications system 100 that supports modulation and coding scheme table design for power efficiency in accordance with one or more aspects of the present disclosure. The wireless communications system 100 includes base stations 105 (e.g., gNodeBs (gNBs), and/or radio heads (RHs)), UEs 115, and a core network 130. In some examples, the wireless communications system 100 may be a LTE network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links. In some cases, a UE 115 may communicate with the core network 130 through a communication link 155.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit of the wireless communications system 100 and may be referred to as a transmission time interval (TTI). In some cases, the TTI duration (that is, the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying certain amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g. synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A base station 105 may include a communications manager 101, which is used to receive, from a UE 115, a priority indicator for a transmission between the UE 115 and the base station 105. The communications manager 101 may also determine a network condition associated with an upcoming transmission in the wireless communications system 100. The communications manager 101 may then transmit control information for a downlink transmission to the UE 115. In some cases, the control information may include an indication of a set of modulation and coding schemes (e.g., an indication of a modulation and coding scheme table) for the UE 115 to use from a plurality of sets of modulation and coding schemes. The indication may be based on the priority indicator and a network condition. The control information may additionally include an index value for an entry in the selected set of modulation and coding schemes. The communications manager 101 may then transmit the downlink transmission to the UE 115 using a modulation order and a code rate associated with the index value for the entry.

A UE 115 may include a communications manager 102, which is used to determine a priority indicator for an upcoming transmission between the UE 115 and the base station 105. The communications manager 102 may transmit the priority indicator to the base station 105. In some cases, the communications manager 102 may receive control information from the base station 105. The control information may include an indication of a set of modulation and coding schemes to select from a plurality of sets of modulation and coding schemes and an index value for an entry in the selected set of modulation and coding scheme. In some cases, the communications manager 102 may identify a combination of a modulation order and a code rate for the downlink transmission based on the index value.

Figure 2:
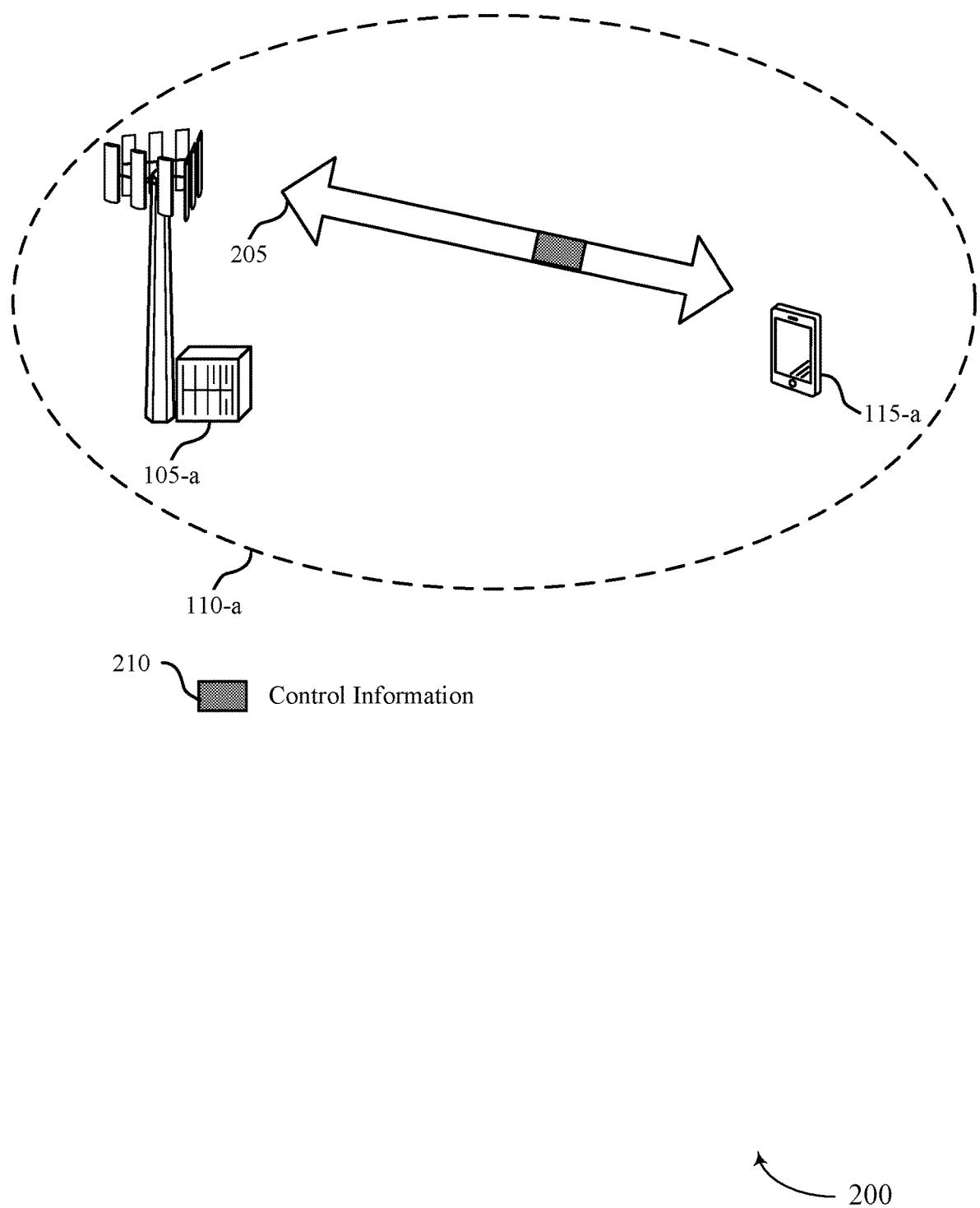
FIG. 2 illustrates an example of a wireless communications system that supports modulation and coding scheme table design for power efficiency in accordance with one or more aspects of the present disclosure.

FIG. 2 illustrates an example of a wireless communications system 200 that supports modulation and coding scheme table design for power efficiency in accordance with one or more aspects of the present disclosure. In some cases, wireless communications system 200, or aspects of wireless communications system 200, may become part of a UE assistance framework for power savings. In some examples, wireless communications system 200 may implement aspects of wireless communications system 100. Wireless communications system 200 may include base station 105-*a* and UE 115-*a*, which may be examples of a base station 105 and a UE 115 described with reference to FIG. 1. In some examples, base station 105-*a* may be in communication with one or more UEs 115 within geographic coverage area 110-*a*. In this example, wireless communications system 200 may support a communications link 205 with multiple modulation orders, such as QPSK, 16 QAM, and 64QAM, and control information 210 may provide an indication of a set of modulation and coding schemes to select from a plurality of sets of modulation and coding schemes. The control information 210 may further provide an index value for an entry in the selected set of modulation and coding scheme. A set of modulation and coding schemes may refer to a table of modulation and coding schemes.

In some cases, as part of a connection establishment to establish the communication link 205, the UE 115-*a* may provide a CQI report and the base station 105-*a* may configure a CQI table that is to be used at the UE 115-*a*. The CQI table may map modulation orders and coding rates to a number (e.g., 16) of index values that are based on CQI values measured at the UE 115-*a*. In current wireless communications systems, the CQI may include information sent from UE 115-*a* to the base station 105-*a* to indicate a suitable downlink transmission data rate (such as, a modulation and coding scheme value). After establishing an initial connection with the base station 105-a, the UE 115-a may observe channel conditions (such as signal-to-noise ratio). For example, the UE 115-a may determine a CQI as a 4-bit integer based on the observed signal-to-noise ratio at the UE 115-a. In some cases, as part of the CQI estimation process, the UE 115-a may account for UE capability such as a number of antennas at the UE 115-a and a type of receiver used for detection by the UE 115-a. In some implementations, for the same signal-to-noise ratio value, the modulation and coding scheme supported by the UE 115-a may depend on the UE capabilities. Wireless communications systems support wideband CQI reporting, where the CQI value is a single 4-bit integer that represents a signal-to-noise ratio as observed by the UE 115-a over a channel bandwidth.

In some legacy systems, the base station 105-a may utilize the CQI value to determine an entry in a modulation and coding scheme table for the UE 115-a. For example, the entry in the modulation and coding scheme table may be linked to the modulation orders of the CQI table. The base station 105-a may then indicate the modulation and coding scheme in signaled control information (such as downlink control indicator (DCI)). Thus, the signaled modulation and coding scheme and the CQI table may be used by the UE 115-a to determine a modulation order, coding rate, and a transport block size for an upcoming transmission. In some cases, the entry of the modulation and coding scheme table may be indicated as part of the control information 210. Existing wireless communications systems use spectral efficiency as a performance metric for assigning modulation orders and coding schemes to a UE 115-a. More specifically, a base station 105-a in existing wireless communications systems determines a modulation order and coding rate for a UE 115-a based on maximizing spectral efficiency of a network shared by the base station 105-a and the UE 115-a. In some implementations, a UE 115-a may prioritize power efficiency over spectral efficiency. To maximize power efficiency at a UE 115-a, the UE 115-a may maximize a power consumed (in Joule) per bit of data transmission. Thus, there exists an efficient way to select modulation and coding schemes and CQI tables to maximize power efficiency.

Techniques of the present disclosure provide for a base station 105-a to determine whether the UE 115-a is allowed to maximize power efficiency based on a network condition. For example, the base station 105-a may determine whether a network is lightly loaded or heavily loaded. Specifically, one or more aspects of the present disclosure provides for a UE 115-a to report different CSI when prioritizing power efficiency over spectral efficiency. Additionally or alternatively, the UE 115-a may be configured to balance spectral efficiency with power-efficiency. In one or more examples, techniques described herein may be included in a UE assistance framework for power savings.

In some cases, if the base station 105-a determines that the network is lightly loaded, the base station 105-a may determine a set of modulation and coding schemes that support power efficiency. The UE 115-a may indicate to the base station 105-a, a priority for power efficiency. In some examples, if the network is lightly loaded, the base station 105-a may select an entry in a modulation and coding scheme table that includes a high code rate and low modulation order. This may result in power efficiency at the UE 115-a. In some cases, if the base station 105-a determines that the network is heavily loaded, the base station 105-a may determine a set of modulation and coding schemes that support spectral efficiency instead of power efficiency. For example, if the network is heavily loaded, the base station 105-a may select an entry in a modulation and coding scheme table that includes a low code rate and high modulation order resulting in spectral efficiency at the UE 115-a. In some cases, the base station 105-a may determine that a network is heavily loaded based on a number of UEs 115-a connected to the network. For example, the base station 105-a may monitor active connections, and if the base station 105-a determines that there are more than a threshold number of active connections in a network, the base station 105-a may determine that the network is heavily loaded. Thus, in such scenarios, the base station 105-a may select a modulation and coding scheme configured for spectral efficiency even when the UE 115-a indicates a priority for power efficiency. If the base station 105-a determines that that there are less than a threshold number of active connections in the network, the base station 105-a may determine that the network is lightly loaded.

In some implementations, the UE 115-a may determine a priority indicator for an upcoming transmission between the UE 115-a and a base station 105-a. To indicate the prioritization to the base station 105-a, the UE 115-a may transmit the priority indicator to the base station 105-a. In some cases, the priority indicator may include an indication of power efficiency prioritization or an indication of spectral efficiency prioritization or a combination. In some examples, if a UE 115-a determines that the priority indicator indicates prioritizing spectral efficiency for one or more upcoming transmissions, the UE 115-a may refrain from transmitting the priority indicator to the base station 105-a.

Upon receiving the priority indicator, the base station 105-a may determine the network condition, and may select a modulation order and coding rate for the UE 115-a based on the network condition. In some cases, if the network condition indicates that the network is lightly loaded (such as a small number of UEs 115-a are connected to the network), the base station 105-a may select a modulation and coding scheme that maximizes power efficiency instead of spectral efficiency. Power efficiency may be maximized by minimizing an average computational complexity of low-density parity-check (LDPC) decoding at the LDPC decoder included in the UE 115-a. More specifically, to maximize power efficiency at the UE 115-a, the base station 105-a may select a modulation and coding scheme that has a low average computational complexity of LDPC decoding.

In some implementations, the UE 115-a may identify a CQI value included in a set of channel quality indicators (such as a CQI table). The CQI table may include combinations of modulation orders and code rates for a transmission between the UE 115-a and the base station 105-a. In some cases, the UE 115-a may determine multiple parameters associated with one or more transmissions between the UE 115-a and the base station 105-a. The parameters may include a bandwidth associated with the transmission between the UE 115-a and the base station 105-a, a number of antennas included in the UE 115-a, a rank value, a PMI associated with the UE 115-a, a MU-MIMO capability of the UE 115-a, a traffic type supported by the UE 115-a, or a combination. The UE 115-a may include one or more of the parameters in a CSI report, and may transmit the CSI report to the base station 105-a.

In some cases, the base station 105-a may select a set of modulation and coding scheme (such as a modulation and coding scheme table) from a plurality of sets of modulation and coding schemes. As one example, the plurality of sets of modulation and coding schemes may include a first modulation and coding scheme table and a second modulation and coding scheme table. The first modulation and coding scheme table may be configured to maximize power efficiency and the second modulation and coding scheme table may be configured to maximize spectral efficiency.

In existing systems, modulation and coding scheme table 1 may be implemented in aspects of wireless communications system 100 or 200. The modulation and coding scheme table 1 may include four columns. The first column may include modulation and coding scheme indices, the second column may include modulation orders, the third column may include target code rate, and the fourth column may include spectral efficiency. As described herein, the modulation and coding scheme table 1 has 32 entries, where the last three entries are reserved. For example, the thirtieth entry (corresponding to modulation and coding scheme (MCS) index 29) through the thirty-second entry (corresponding to MCS index 31) may be reserved. Among the remaining entries, each entry is associated with modulation order, a target code rate, and a spectral efficiency.

In the modulation and coding scheme table 1, the modulation order 2 is associated with QPSK modulation, the modulation order 4 is associated with 16 QAM, and the modulation order 6 is associated with 64 QAM. As one example, the tenth entry corresponding to MCS index 9 is associated with QPSK modulation order, a code rate of 679/1024, and a spectral efficiency of 1.3263. Additionally, the eleventh entry corresponding to MCS index 10 is associated with a 16 QAM modulation order, a code rate of 340/1024, and a spectral efficiency of 1.3281. Similarly, as another example, the seventeenth entry corresponding to MCS index 16 is associated with a 16 QAM modulation order, a code rate of 658/1024, and a spectral efficiency of 2.5703. Additionally, the eighteenth entry corresponding to MCS index 17 is associated with a 64 QAM modulation order, a code rate of 438/1024, and a spectral efficiency of 2.5664. Thus, it may be noted that the tenth entry corresponding to MCS index 9 and the eleventh entry corresponding to MCS index 10 are associated with similar spectral efficiencies. Similarly, the seventeenth entry corresponding to MCS index 16 and the eighteenth entry corresponding to MCS index 17 are associated with similar spectral efficiencies. In some cases, similar spectral efficiencies may be referred to spectral efficiencies which are within a predefined range from each other. A calculation of spectral efficiencies and power efficiencies associated with these MCS entries are further described with reference to FIG. 3.

TABLE 1

| MCS Index | Modulation Order | Target Code Rate * 1024 | Spectral Efficiency |
| --- | --- | --- | --- |
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3263 |
| 10 | 4 | 340 | 1.3281 |
| 11 | 4 | 378 | 1.4766 |
| 12 | 4 | 434 | 1.6953 |
| 13 | 4 | 390 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |

TABLE 1-continued

| MCS Index | Modulation Order | Target Code Rate * 1024 | Spectral Efficiency |
| --- | --- | --- | --- |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

In some examples, the base station 105-a may determine a modulation order and a code rate for a UE 115-a based on the spectral efficiency and the priority indicator. As previously discussed, the modulation and coding scheme table 1 may be configured to maximize spectral efficiency. To maximize power efficiency, the base station 105-a may select a second modulation and coding scheme table (not shown) which include more entries with high modulation order and low coding rate than the modulation and coding scheme table 1. In some cases, upon receiving a CSI report including a priority indicator indicating power efficiency prioritization, the base station 105-a may perform a network analysis to determine whether the network is heavily loaded or lightly loaded. If the base station 105-a determines that the network is lightly loaded, then the base station 105-a may indicate a second modulation and coding scheme table (not shown) which include more entries with high modulation order and low coding rate than the modulation and coding scheme table 1. For example, the base station 105-a may indicate the second modulation and coding scheme table to the UE 115-a. In some implementations, the base station 105-a may further indicate an index value for an entry in the second modulation and coding scheme table. Alternatively, if the base station 105-a determines that the network is heavily loaded, then the base station 105-a may indicate the modulation and coding scheme table 1 to the UE 115-a. That is, if the network is heavily loaded, the base station 105-a may indicate the modulation and coding scheme table 1 configured for spectral efficiency.

Further, in some cases, the base station 105-a may transmit a DCI to the UE 115-a. The DCI may include a bit identifying the index value for the entry in the selected set of modulation and coding schemes (i.e., modulation and coding scheme table). In some cases, the UE 115-a may receive the DCI, and may identify a combination of a modulation order and a code rate for the downlink transmission based on the index value. Additionally or alternatively, the base station 105-a may receive an RRC connection setup request from the UE 115-a. Upon receiving the RRC connection setup request, the base station 105-a may transmit an RRC connection setup response identifying the index value for the entry in the selected set of modulation and coding schemes to the UE 115-a. In some additional examples, the base station 105-a may transmit an RNTI identifying the index value for the entry in the selected set of modulation and coding schemes to the UE 115-a. Thus, the base station 105-a and UE 115-a may use such techniques when configured to design new modulation and coding schemes and CQI tables for maximizing power efficiency at a UE 115-a.

Figure 3:
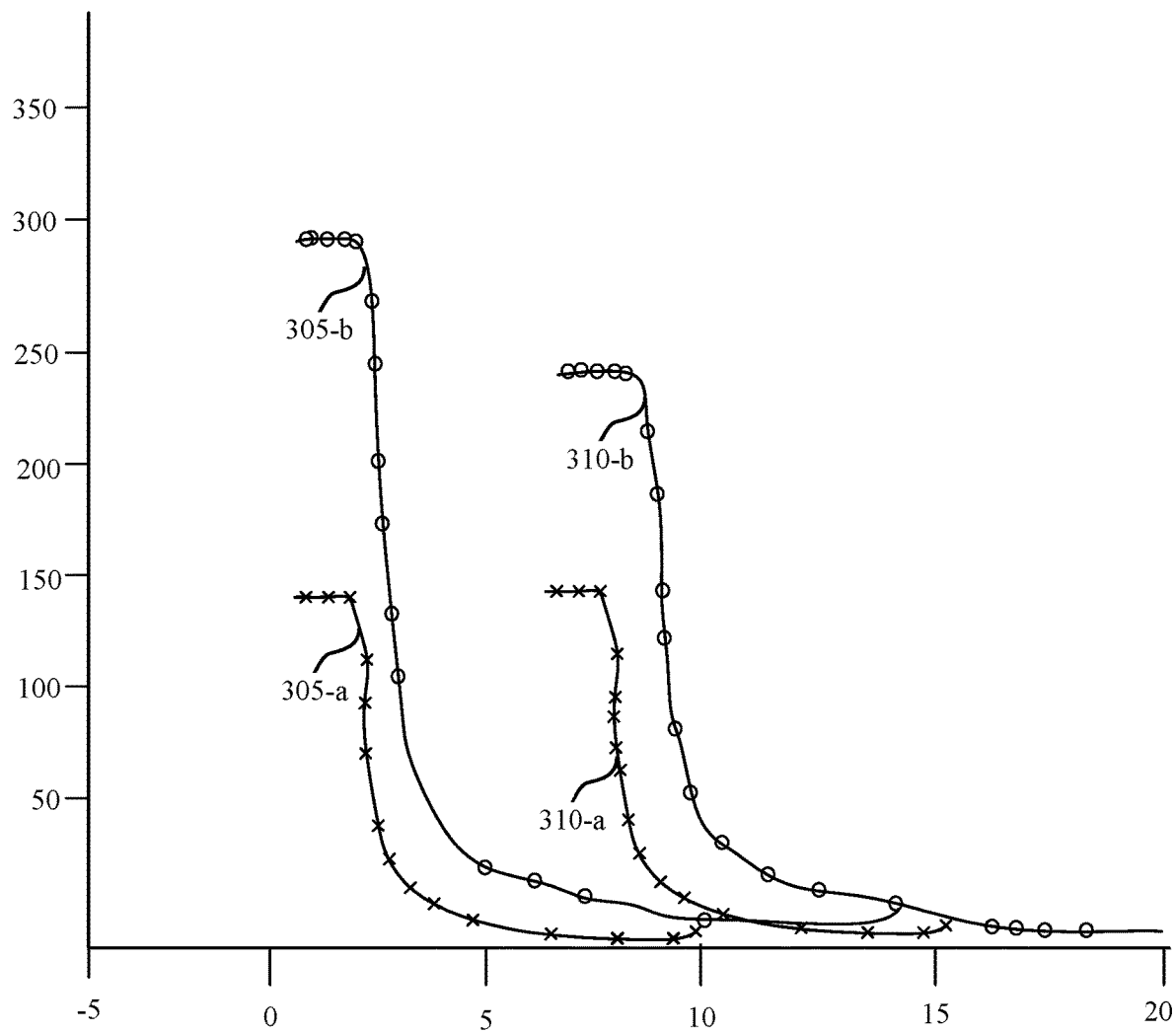
FIG. 3 illustrates an example of a graphical analysis that supports modulation and coding scheme table design for power efficiency in accordance with one or more aspects of the present disclosure.

FIG. 3 illustrates an example of a graphical analysis 300 that supports modulation and coding scheme table design for power efficiency in accordance with one or more aspects of the present disclosure. In some examples, graphical analysis 300 may be implemented using the modulation and coding scheme table 1 in aspects of wireless communications system 100 or 200. As discussed above, in some cases the modulation and coding scheme table 1 includes four columns, where the first column indicates modulation and coding scheme indices, the second column indicates modulation orders, the third column indicates target code rate, and the fourth column indicates spectral efficiency. The graphical analysis 300 illustrates a comparison between the spectral efficiencies for multiple entries in the modulation and coding scheme table 1. The X-axis for the graphical analysis 300 is signal-to-noise ratio and the Y-axis is a normalized computational complexity for one or more entries of the modulation and coding scheme table 1.

In some implementations, the configuration setup for the graphical analysis 300 is a fixed number of resource blocks and a fixed number of symbols per block. In some examples, the fixed number of resource blocks may be fifty and the fixed number of symbols per block may be seven. In some examples, the first symbol may include demodulation reference signal (DMRS) FDM-ed with data. In some implementations, LDPC decoder type BG1 or type BG2 may be used to achieve the graphical analysis 300. Additionally, a number of iterations may be fixed. In the example of FIG. 3, the graph 305-a indicates the normalized computational complexity of the tenth entry of the modulation and coding scheme table 1 corresponding to MCS index 9 and the graph 305-b indicates the normalized computational complexity of the eleventh entry of the modulation and coding scheme table 1 corresponding to MCS index 11. Additionally, the graph 310-a indicates the normalized computational complexity of the seventeenth entry of the modulation and coding scheme table 1 corresponding to MCS index 16 and the graph 310-b indicates the normalized computational complexity of the eighteenth entry of the modulation and coding scheme table 1 corresponding to MCS index 17.

As previously described, MCS index 9 is associated with QPSK modulation order, a code rate of 679/1024, and a spectral efficiency of 1.3263, and MCS index 10 is associated with a 16 QAM modulation order, a code rate of 340/1024, and a spectral efficiency of 1.3281. Additionally, MCS index 16 is associated with a 16 QAM modulation order, a code rate of 658/1024, and a spectral efficiency of 2.5703, and MCS index 17 is associated with a 64 QAM modulation order, a code rate of 438/1024, and a spectral efficiency of 2.5664. In some cases, the normalized computational complexity may be computed as an average iteration number*number of edges in an LDPC code/number of information bits.

As described in FIG. 3, a normalized computational complexity of the graph 305-a is less than a normalized computational complexity of the graph 305-b. Additionally, a normalized computational complexity of the graph 310-a is less than the normalized computational complexity of the graph 310-b. Thus, graphical analysis 300 notes that although MCS index 9 and MCS index 10 are associated with similar spectral efficiencies, MCS index 9 offers greater power efficiency than MCS index 10. Similarly, MCS index 16 and MCS index 17 are associated with similar spectral efficiencies, but MCS index 16 offers greater power efficiency than MCS index 17.

Figure 4:
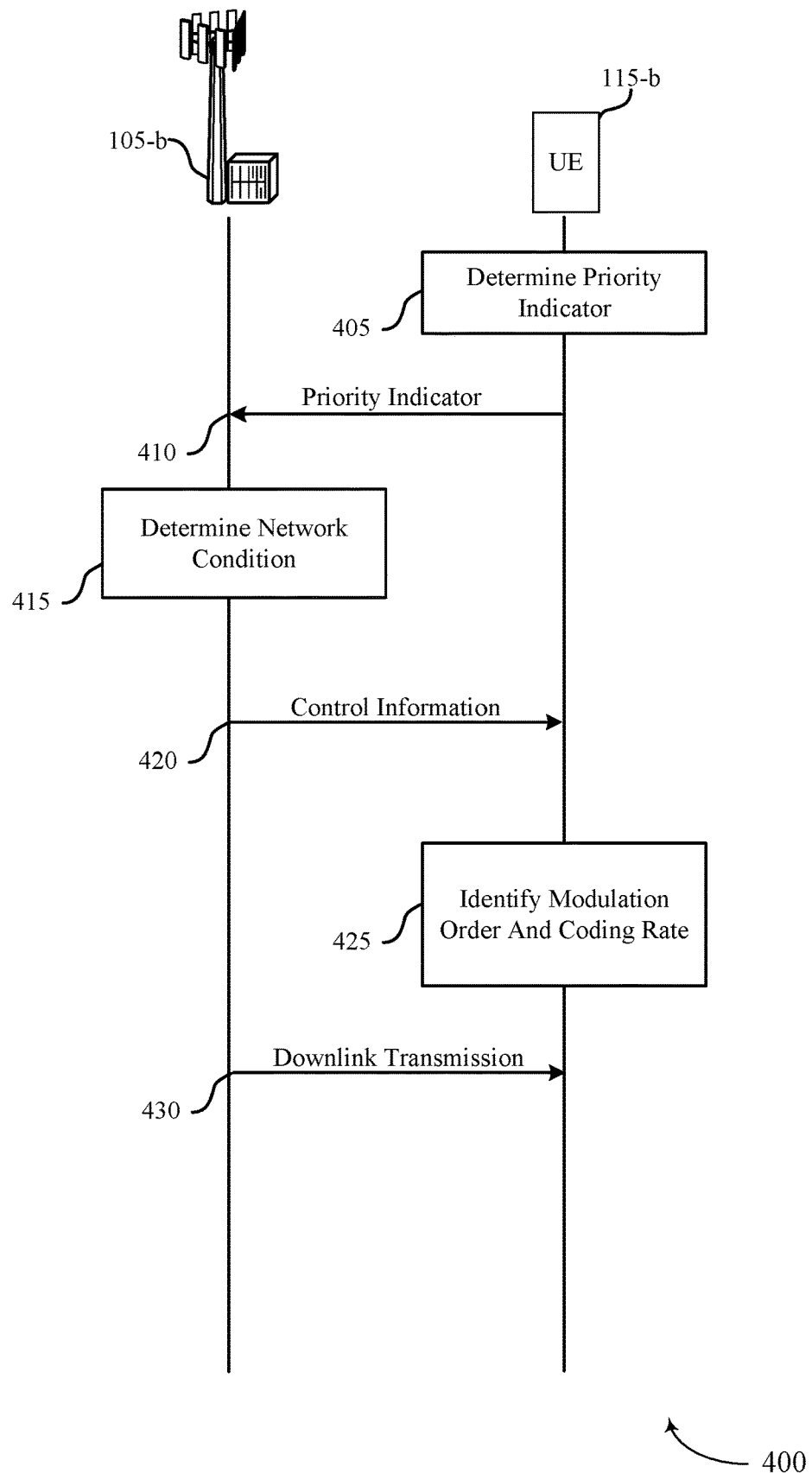
FIG. 4 illustrates an example of a process flow that supports modulation and coding scheme table design for power efficiency in accordance with one or more aspects of the present disclosure.

FIG. 4 illustrates an example of a process flow 400 that supports modulation and coding scheme table design for power efficiency in accordance with one or more aspects of the present disclosure. Base station 105-b, as well as UE 115-b, may be examples of the corresponding devices described with reference to FIGS. 1 and 2. In some examples, the process flow 400 may implement aspects of the wireless communications systems 100 and 200. In some examples, the process flow 400 may implement aspects or features of the analysis 300 as described with reference to FIG. 3. For example, the UE 115-b may support modulation and coding scheme table design for power efficiency in accordance with modulation and coding scheme tables provided by the base stations 105-b.

In the following description of the process flow 400, the operations between UE 115-b and base station 105-b may be transmitted in a different order than the exemplary order shown. The operations performed by UE 115-b and base station 105-b may be performed in different orders or at different times than the exemplary order shown. Certain operations may also be left out of the process flow 400, or other operations may be added to the process flow 400. Further, base station 105-b and UE 115-b are not meant to be representative, as the described features may be associated with any number of devices.

At 405, UE 115-b may determine a priority indicator for an upcoming transmission between the UE and a base station. In some cases, the priority indicator may include an indication of power efficiency prioritization or an indication of spectral efficiency prioritization or a combination.

In some cases, the UE 115-b may additionally identify a CQI value included in a CQI table. In some examples, the CQI table may include combinations of modulation orders and code rates for a transmission between the UE 115-b and the base station 105-b. The UE 115-b may further determine a bandwidth associated with the transmission between the UE 115-b and the base station 105-b, a number of antennas included in the UE 115-b, a rank value associated with the UE 115-b, a PMI associated with the UE 115-b, a MU-MIMO capability of the UE 115-b, a traffic type supported by the UE 115-b, or a combination thereof. At 410, the UE 115-b may transmit the priority indicator to the base station 105-b. The base station 105-b may receive and identify the priority indicator transmitted by the UE 115-b.

At 415, base station 105-b may determine a network condition associated with an upcoming transmission between the UE 115-b and the base station 105-b. The base station 105-b may then determine control information for a downlink transmission with the UE 115-b. In some cases, the control information may include an indication (such as a first indicator) of a set of modulation and coding schemes for the UE 115-b to use from a plurality of sets of modulation and coding schemes. In some cases, the control information may include an additional indication (such as a second indicator) of an index value for an entry in the selected set of modulation and coding schemes. In some examples, the base station 105-b may determine the index based on the priority indicator and the network condition.

In one example, the plurality of sets of modulation and coding schemes may include a first set of modulation and coding schemes in the plurality of sets of modulation and coding schemes is configured to maximize power efficiency and a second set of modulation and coding schemes in the plurality of sets of modulation and coding schemes is configured to maximize spectral efficiency. The base station 105-b may determine that a network associated with the UE and the base station is lightly loaded and that the priority indicator includes an indication of power efficiency prioritization. In such a case, the base station 105-b may select the first set of modulation and coding schemes that is configured to maximize power efficiency. Alternatively, the base station 105-*b* may determine that a network associated with the UE and the base station is heavily loaded and that the priority indicator includes an indication of power efficiency prioritization. In such scenarios, the base station 105-*b* may select the second set of modulation and coding schemes that is configured to maximize spectral efficiency.

At 420, base station 105-*b* may transmit the control information to the UE 115-*b*. At 425 UE 115-*b* may identify a combination of a modulation order and a code rate for the downlink transmission based on the index value indicated in the control information. At 430, the base station 105-*b* may transmit the downlink transmission to the UE 115-*b* using the modulation order and the code rate. The UE 115-*b* may be configured to decode the downlink transmission using the identified modulation order and code rate.

Figure 5:
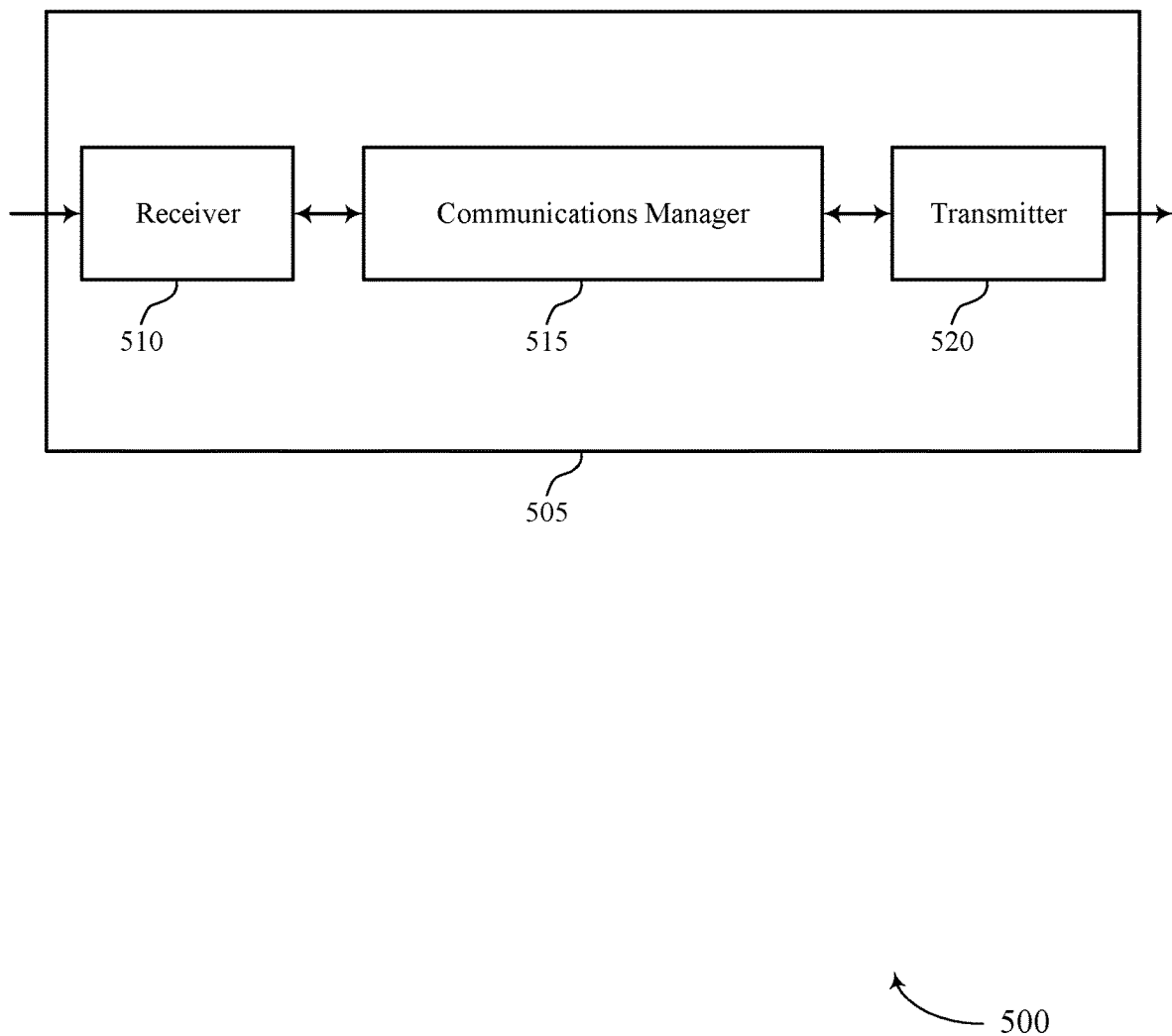
FIGS. 5 and 6 show block diagrams of devices that support modulation and coding scheme table design for power efficiency in in accordance with one or more aspects of the present disclosure.

FIG. 5 shows a block diagram 500 of a device 505 that supports modulation and coding scheme table design for power efficiency in accordance with one or more aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to modulation and coding scheme table design for power efficiency, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may determine a priority indicator for an upcoming transmission between the UE and a base station, transmit the priority indicator to the base station, receive, from the base station, control information for a downlink transmission, the control information including an indication of a set of modulation and coding schemes to select from a plurality of sets of modulation and coding schemes and an index value for an entry in the selected set of modulation and coding scheme, where the indication is based on the priority indicator and a network condition, and identify a combination of a modulation order and a code rate for the downlink transmission based on the index value. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with one or more aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with one or more aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
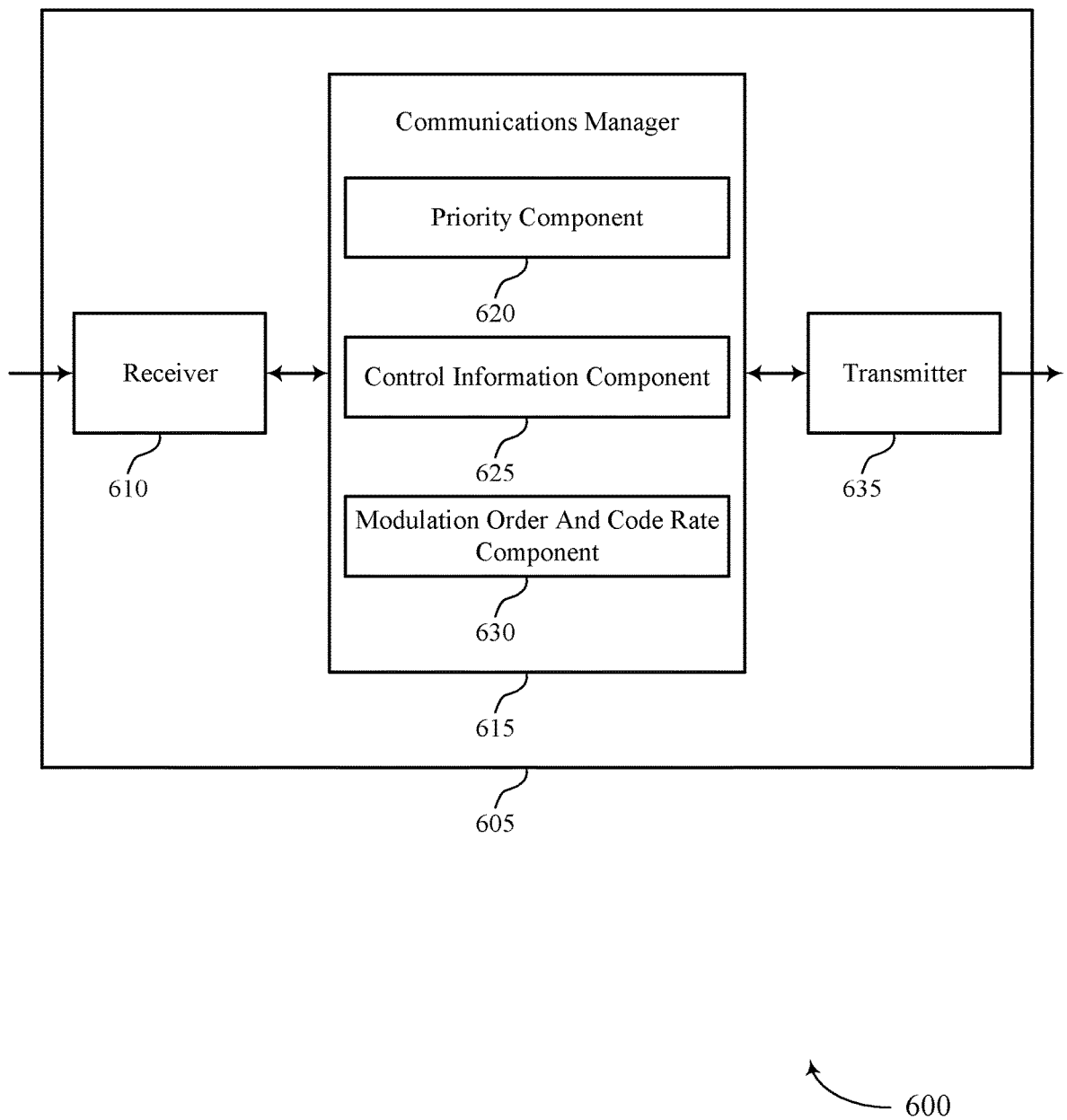

FIG. 6 shows a block diagram 600 of a device 605 that supports modulation and coding scheme table design for power efficiency in accordance with one or more aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to modulation and coding scheme table design for power efficiency, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a priority component 620, a control information component 625, and a modulation order and code rate component 630. The communications manager 615 may be an example of aspects of the communications manager 810 described herein.

The priority component 620 may determine a priority indicator for an upcoming transmission between the UE and a base station and transmit the priority indicator to the base station. The control information component 625 may receive, from the base station, control information for a downlink transmission, the control information including an indication of a set of modulation and coding schemes to select from a plurality of sets of modulation and coding schemes and an index value for an entry in the selected set of modulation and coding scheme, where the indication is based on the priority indicator and a network condition. The modulation order and code rate component 630 may identify a combination of a modulation order and a code rate for the downlink transmission based on the index value.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
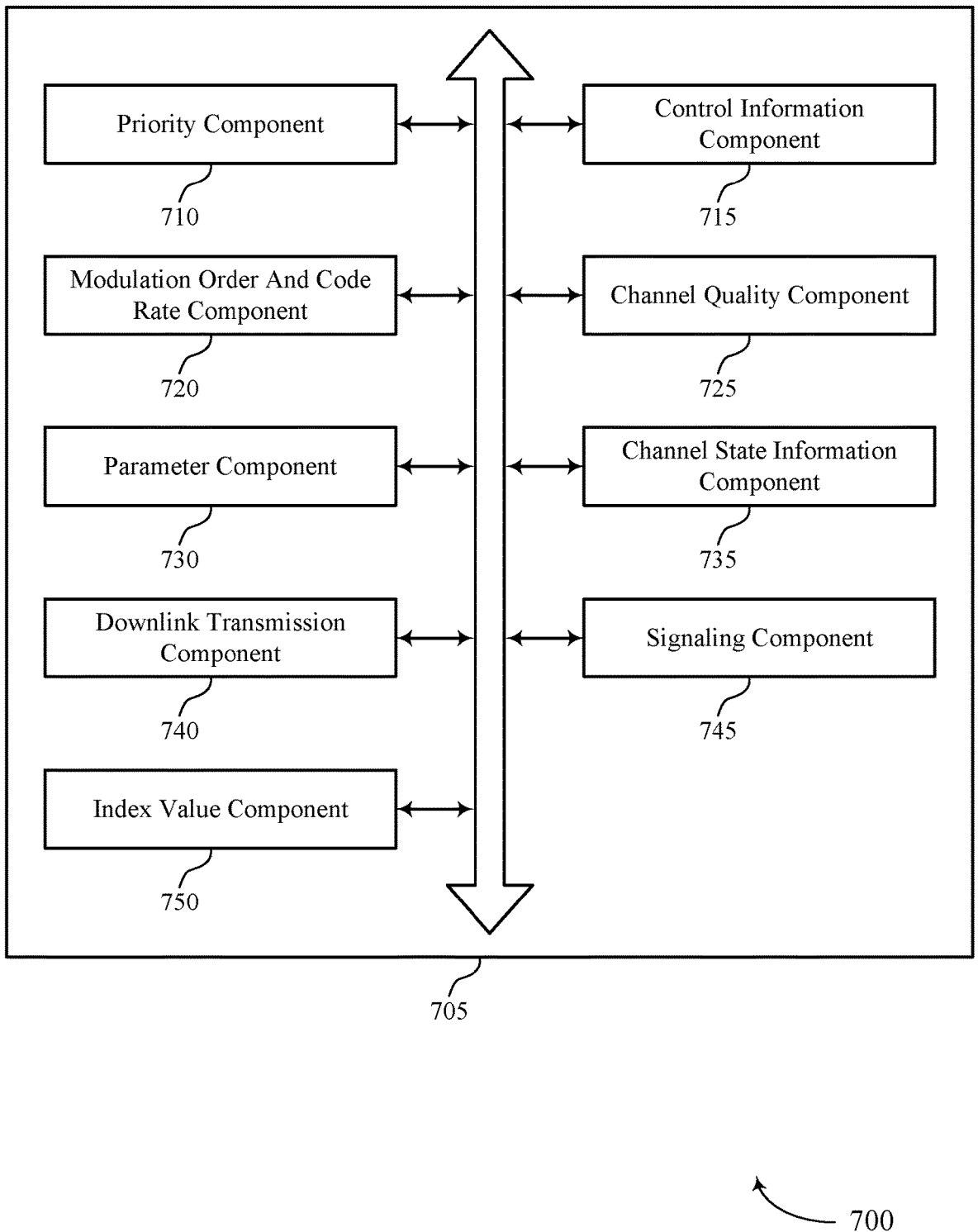
FIG. 7 shows a block diagram of a communications manager that supports modulation and coding scheme table design for power efficiency in accordance with one or more aspects of the present disclosure.

FIG. 7 shows a block diagram 700 of a communications manager 705 that supports modulation and coding scheme table design for power efficiency in accordance with one or more aspects of the present disclosure. The communications manager 705 may be an example of aspects of a communications manager 515, a communications manager 615, or a communications manager 810 described herein. The communications manager 705 may include a priority component 710, a control information component 715, a modulation order and code rate component 720, a channel quality component 725, a parameter component 730, a channel state information component 735, a downlink transmission component 740, a signaling component 745, and an index value component 750. Each of these modules may communicate, directly or indirectly, with one another (e.g., via one or more buses).

The priority component 710 may determine a priority indicator for an upcoming transmission between the UE and a base station. In some examples, the priority component 710 may transmit the priority indicator to the base station. In some cases, the priority indicator includes an indication of power efficiency prioritization or an indication of spectral efficiency prioritization or a combination thereof.

The control information component 715 may receive, from the base station, control information for a downlink transmission, the control information including an indication of a set of modulation and coding schemes to select from a plurality of sets of modulation and coding schemes and an index value for an entry in the selected set of modulation and coding scheme, where the indication is based on the priority indicator and a network condition. In some examples, the control information component 715 may process the control information to determine the modulation order, the code rate, or both from the base station.

In some cases, the network condition indicates whether a network associated with the UE and the base station is heavily loaded or lightly loaded. In some cases, a first set of modulation and coding schemes in the plurality of sets of modulation and coding schemes is configured to maximize power efficiency and a second set of modulation and coding schemes in the plurality of sets of modulation and coding schemes is configured to maximize spectral efficiency. In some cases, the first set of modulation and coding schemes includes more entries with high modulation order and low coding rate than the second set of modulation and coding schemes.

The modulation order and code rate component 720 may identify a combination of a modulation order and a code rate for the downlink transmission based on the index value. In some examples, the modulation order and code rate component 720 may request a modulation order and a coding scheme using a CQI value, the requested modulation order and coding scheme being based on the channel quality. In some cases, the index value identifies the entry from a set of available entries of the selected set of modulation and coding schemes. In some cases, the modulation order includes at least of a QPSK modulation, a 16 QAM, a 64 QAM, or a combination thereof.

The channel quality component 725 may identify a CQI value included in a set of channel quality indicators, the set of channel quality indicators including combinations of modulation orders and code rates for a transmission between the UE and a base station. In some examples, the channel quality component 725 may determine a channel quality for a transmission between the UE and the base station.

The parameter component 730 may determine a bandwidth associated with the transmission between the UE and the base station. In some examples, the parameter component 730 may determine at least one of a number of antennas included in the UE, a rank value associated with the UE, a PMI associated with the UE, a MU-MIMO capability of the UE, a traffic type supported by the UE, or a combination thereof.

The channel state information component 735 may transmit a CSI to the base station, the CSI including the identified CQI value, the priority indicator, and the bandwidth associated with the transmission between the UE and the base station. In some examples, the channel state information component 735 may transmit a CSI to the base station, the CSI including at least one of the priority indicator, the number of antennas, the rank value, the PMI, the MU-MIMO capability of the UE, the traffic type, or a combination thereof.

The downlink transmission component 740 may receive the downlink transmission from the base station. In some examples, the downlink transmission component 740 may decode the downlink transmission based on the combination of the modulation order and the code rate. The signaling component 745 may receive a DCI from the base station. In some examples, the signaling component 745 may transmit an RRC connection setup request to the base station.

In some examples, the signaling component 745 may receive an RRC connection setup response from the base station. In some examples, the signaling component 745 may receive an RNTI from the base station. The index value component 750 may identify the index value for the entry in the selected set of modulation and coding schemes based on a bit included in the DCI.

In some examples, the index value component 750 may identify the index value for the entry in the selected set of modulation and coding schemes based on the RRC connection setup response. In some examples, the index value component 750 may identify the index value for the entry in the selected set of modulation and coding schemes based on the received RNTI.

Figure 8:
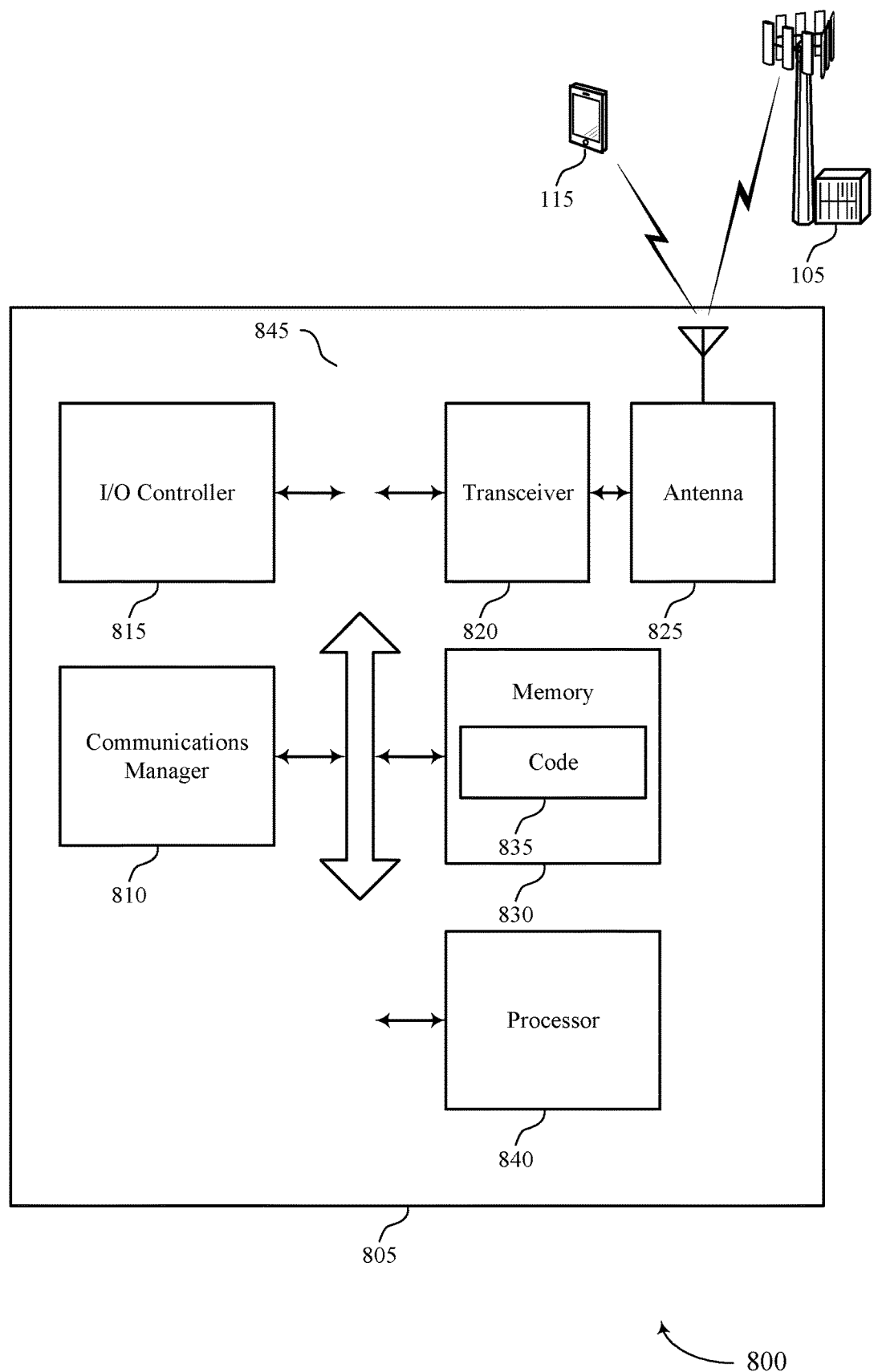
FIG. 8 shows a diagram of a system including a device that supports modulation and coding scheme table design for power efficiency in accordance with one or more aspects of the present disclosure.

FIG. 8 shows a diagram of a system 800 including a device 805 that supports modulation and coding scheme table design for power efficiency in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may determine a priority indicator for an upcoming transmission between the UE and a base station, transmit the priority indicator to the base station, receive, from the base station, control information for a downlink transmission, the control information including an indication of a set of modulation and coding schemes to select from a plurality of sets of modulation and coding schemes and an index value for an entry in the selected set of modulation and coding scheme, where the indication is based on the priority indicator and a network condition, and identify a combination of a modulation order and a code rate for the downlink transmission based on the index value.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a Central Processing Unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting modulation and coding scheme table design for power efficiency).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
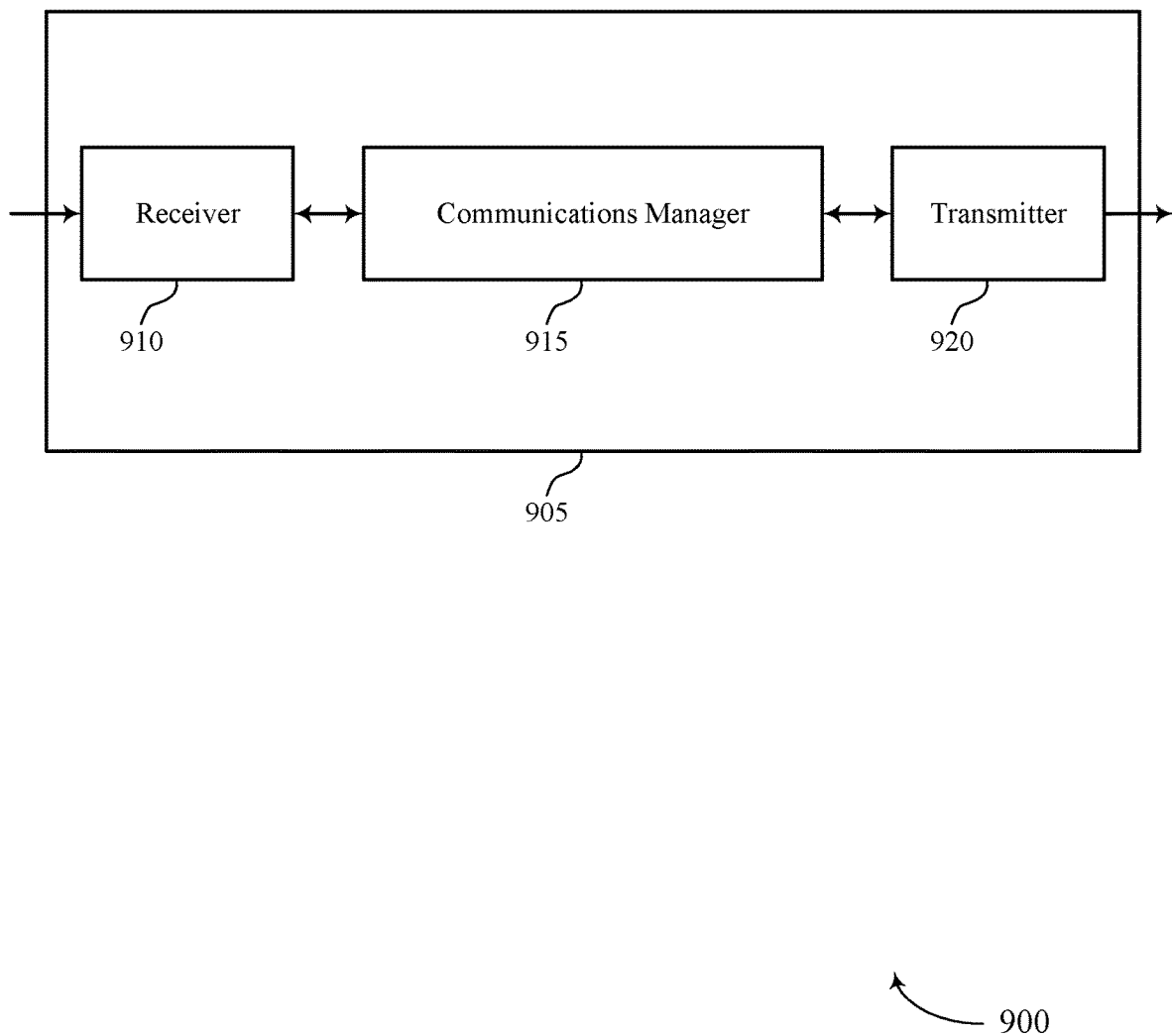
FIGS. 9 and 10 show block diagrams of devices that support modulation and coding scheme table design for power efficiency in accordance with one or more aspects of the present disclosure.

FIG. 9 shows a block diagram 900 of a device 905 that supports modulation and coding scheme table design for power efficiency in accordance with one or more aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to modulation and coding scheme table design for power efficiency, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive from a UE, a priority indicator for a transmission between the UE and the base station, determine a network condition associated with an upcoming transmission between the UE and the base station, transmit, to the UE, control information for a downlink transmission, the control information including an indication of a set of modulation and coding schemes for the UE to use from a plurality of sets of modulation and coding schemes and an index value for an entry in the selected set of modulation and coding schemes, where the indication is based on the priority indicator and a network condition, and transmit the downlink transmission to the UE using a modulation order and a code rate associated with the index value for the entry in the selected set of modulation and coding schemes. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
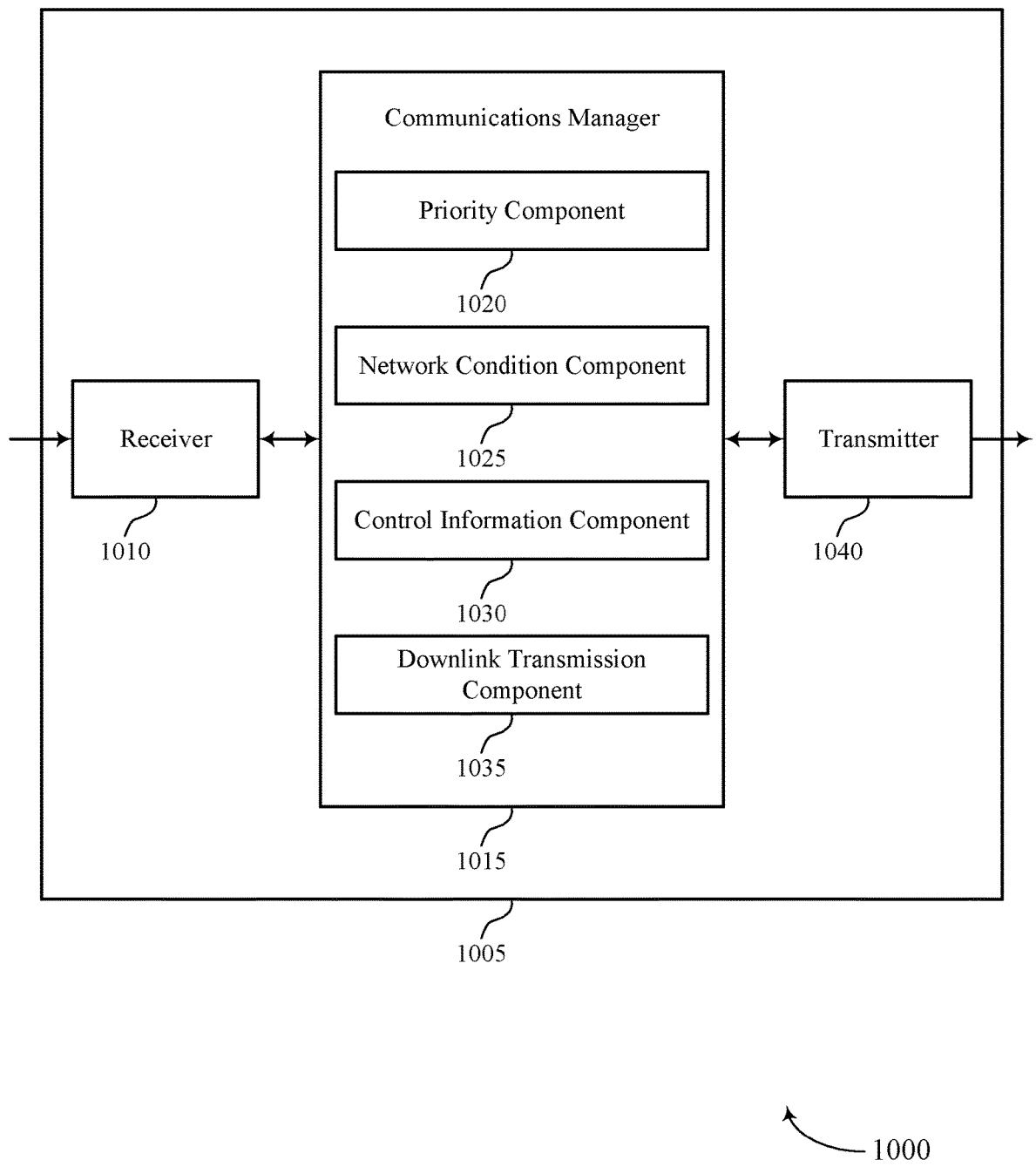

FIG. 10 shows a block diagram 1000 of a device 1005 that supports modulation and coding scheme table design for power efficiency in accordance with one or more aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to modulation and coding scheme table design for power efficiency, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a priority component 1020, a network condition component 1025, a control information component 1030, and a downlink transmission component 1035. The communications manager 1015 may be an example of aspects of the communications manager 1210 described herein.

The priority component 1020 may receive from a UE, a priority indicator for a transmission between the UE and the base station. The network condition component 1025 may determine a network condition associated with an upcoming transmission between the UE and the base station.

The control information component 1030 may transmit, to the UE, control information for a downlink transmission, the control information including an indication of a set of modulation and coding schemes for the UE to use from a plurality of sets of modulation and coding schemes and an index value for an entry in the selected set of modulation and coding schemes, where the indication is based on the priority indicator and a network condition.

The downlink transmission component 1035 may transmit the downlink transmission to the UE using a modulation order and a code rate associated with the index value for the entry in the selected set of modulation and coding schemes.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
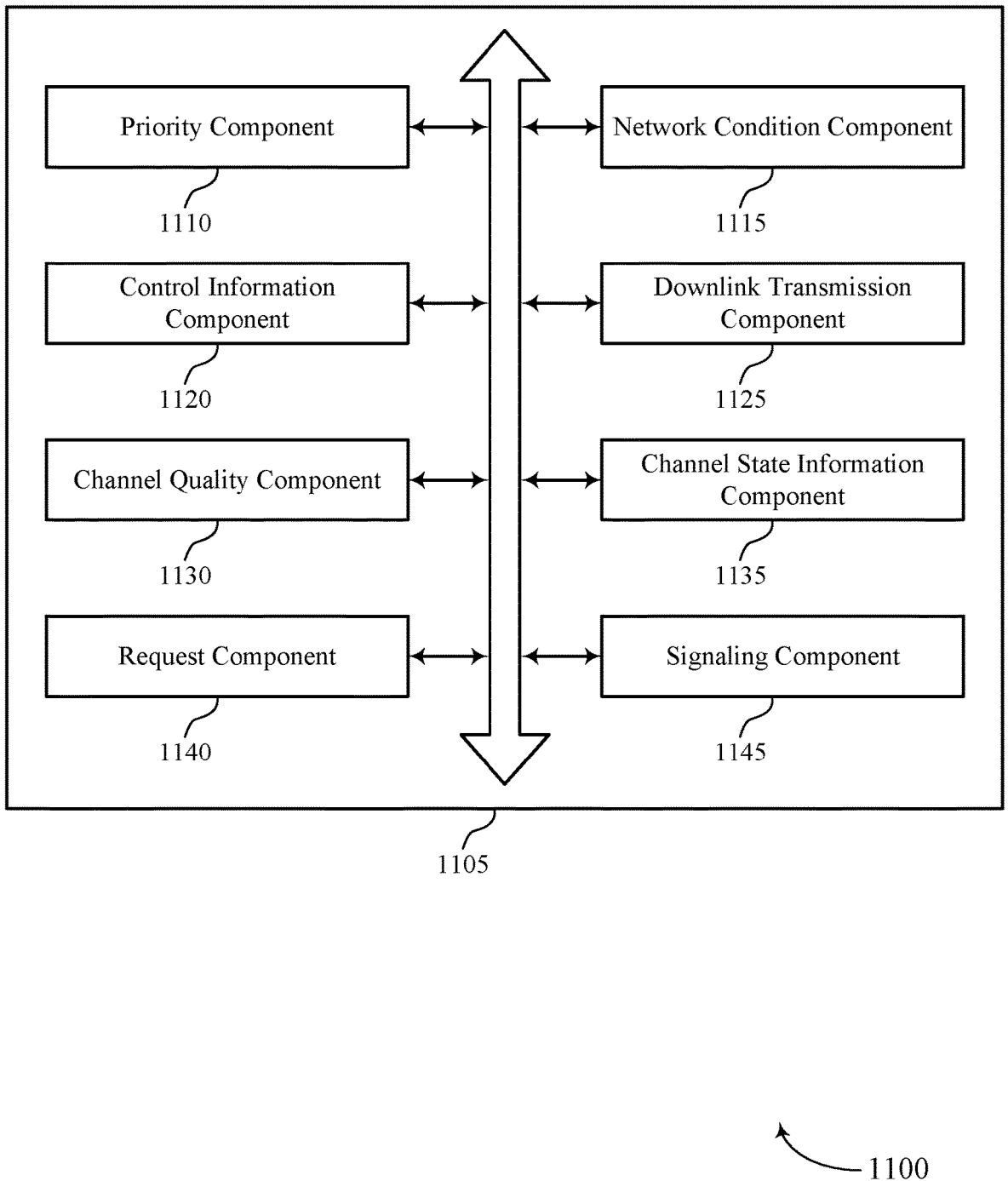
FIG. 11 shows a block diagram of a communications manager that supports modulation and coding scheme table design for power efficiency in accordance with one or more aspects of the present disclosure.

FIG. 11 shows a block diagram 1100 of a communications manager 1105 that supports modulation and coding scheme table design for power efficiency in accordance with one or more aspects of the present disclosure. The communications manager 1105 may be an example of aspects of a communications manager 915, a communications manager 1015, or a communications manager 1210 described herein. The communications manager 1105 may include a priority component 1110, a network condition component 1115, a control information component 1120, a downlink transmission component 1125, a channel quality component 1130, a channel state information component 1135, a request component 1140, and a signaling component 1145. Each of these modules may communicate, directly or indirectly, with one another (e.g., via one or more buses).

The priority component 1110 may receive from a UE, a priority indicator for a transmission between the UE and the base station. In some cases, the priority indicator includes an indication of power efficiency prioritization or an indication of spectral efficiency prioritization. The network condition component 1115 may determine a network condition associated with an upcoming transmission between the UE and the base station.

In some examples, the network condition component 1115 may determine that a network associated with the UE and the base station is heavily loaded, where the transmitted modulation order is greater than the requested modulation order and the transmitted code rate is less than the requested code rate.

In some examples, determining that a network associated with the UE and the base station is lightly loaded and that the priority indicator includes an indication of power efficiency prioritization. In some examples, determining that a network associated with the UE and the base station is heavily loaded and that the priority indicator includes an indication of power efficiency prioritization. In some cases, the network condition indicates whether a network associated with the UE and the base station is heavily loaded or lightly loaded.

The control information component 1120 may transmit, to the UE, control information for a downlink transmission, the control information including an indication of a set of modulation and coding schemes for the UE to use from a plurality of sets of modulation and coding schemes and an index value for an entry in the selected set of modulation and coding schemes, where the indication is based on the priority indicator and a network condition.

In some examples, the control information component 1120 may select the set of modulation and coding schemes from a plurality of sets of modulation and coding schemes based on the priority indicator. In some examples, the control information component 1120 may select the first set of modulation and coding schemes that is configured to maximize power efficiency based on the determining.

In some examples, the control information component 1120 may select the second set of modulation and coding schemes that is configured to maximize spectral efficiency based on the determining. In some cases, the index value identifies the entry from a set of available entries of the selected set of modulation and coding schemes.

In some cases, a first set of modulation and coding schemes in the plurality of sets of modulation and coding schemes is configured to maximize power efficiency and a second set of modulation and coding schemes in the plurality of sets of modulation and coding schemes is configured to maximize spectral efficiency. In some cases, the first set of modulation and coding schemes includes more entries with high modulation order and low coding rate than the second set of modulation and coding schemes.

The downlink transmission component 1125 may transmit the downlink transmission to the UE using a modulation order and a code rate associated with the index value for the entry in the selected set of modulation and coding schemes. In some cases, the modulation order includes at least one of a QPSK modulation, a 16 QAM, and a 64 QAM.

The channel quality component 1130 may receive a CQI value from the UE, the CQI value being included in a set of channel quality indicators that includes combinations of modulation orders and code rates for a transmission between the UE and the base station. The channel state information component 1135 may receive a CSI from the UE, the CSI including the identified CQI value, the priority indicator, and a bandwidth associated with the transmission between the UE and the base station.

In some examples, the channel state information component 1135 may receive a CSI from the UE, the CSI including at least one of a CQI value, the priority indicator, a number of antennas included in the UE, a rank value associated with the UE, a PMI associated with the UE, a MU-MIMO capability of the UE and a traffic type supported by the UE.

The request component 1140 may receive a request for a modulation order and a coding scheme from the UE, the requested modulation order and coding scheme being based on a channel quality associated with the UE. The signaling component 1145 may transmit a DCI to the UE, the DCI including a bit identifying the index value for the entry in the selected set of modulation and coding schemes.

In some examples, the signaling component 1145 may receive an RRC connection setup request from the UE. In some examples, the signaling component 1145 may transmit an RRC connection setup response identifying the index value for the entry in the selected set of modulation and coding schemes to the UE. In some examples, the signaling component 1145 may transmit an RNTI identifying the index value for the entry in the selected set of modulation and coding schemes to the UE.

Figure 12:
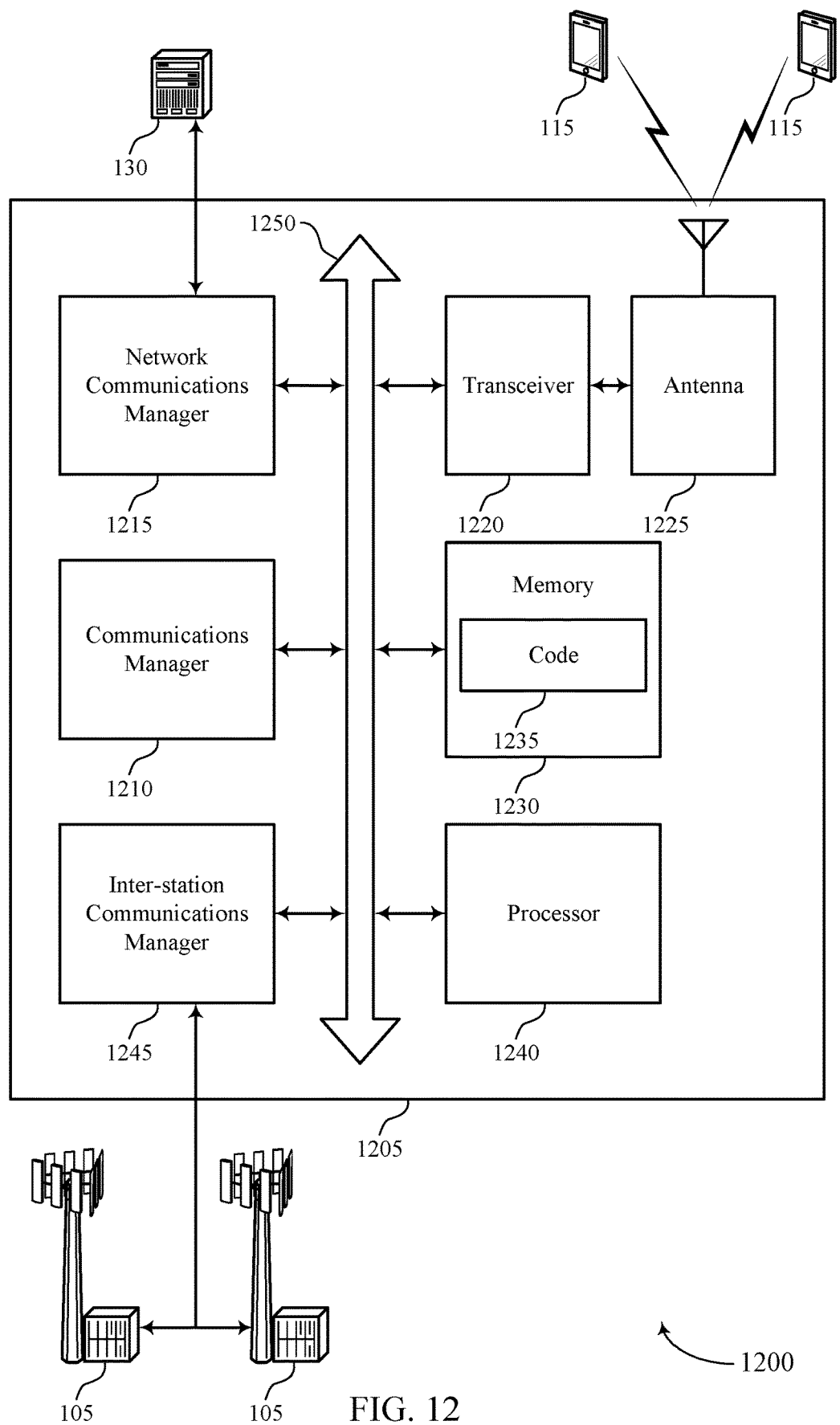
FIG. 12 shows a diagram of a system including a device that supports modulation and coding scheme table design for power efficiency in accordance with one or more aspects of the present disclosure.

FIG. 12 shows a diagram of a system 1200 including a device 1205 that supports modulation and coding scheme table design for power efficiency in accordance with one or more aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive from a UE, a priority indicator for a transmission between the UE and the base station, determine a network condition associated with an upcoming transmission between the UE and the base station, transmit, to the UE, control information for a downlink transmission, the control information including an indication of a set of modulation and coding schemes for the UE to use from a plurality of sets of modulation and coding schemes and an index value for an entry in the selected set of modulation and coding schemes, where the indication is based on the priority indicator and a network condition, and transmit the downlink transmission to the UE using a modulation order and a code rate associated with the index value for the entry in the selected set of modulation and coding schemes.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting modulation and coding scheme table design for power efficiency).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
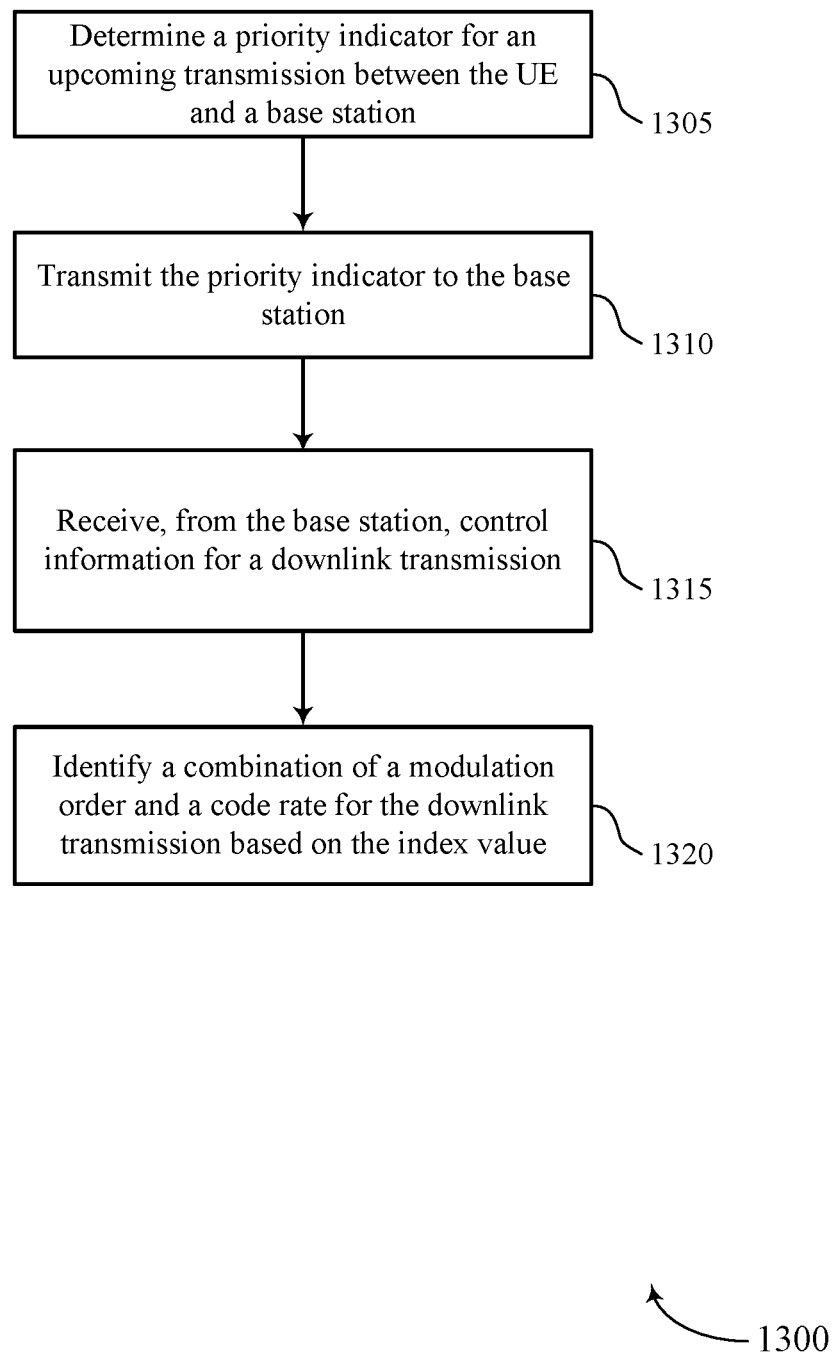
FIGS. 13 through 16 show flowcharts illustrating methods that support modulation and coding scheme table design for power efficiency in accordance with one or more aspects of the present disclosure.

FIG. 13 shows a flowchart illustrating a method 1300 that supports modulation and coding scheme table design for power efficiency in accordance with one or more aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described using special-purpose hardware.

At 1305, the UE may determine a priority indicator for an upcoming transmission between the UE and a base station. The operations of 1305 may be performed according to the methods described herein. In some examples, aspects of the operations of 1305 may be performed by a priority component as described with reference to FIGS. 5 through 8.

At 1310, the UE may transmit the priority indicator to the base station. The operations of 1310 may be performed according to the methods described herein. In some examples, aspects of the operations of 1310 may be performed by a priority component as described with reference to FIGS. 5 through 8.

At 1315, the UE may receive, from the base station, control information for a downlink transmission. In some cases, the control information may include an indication of a set of modulation and coding schemes to select from a plurality of sets of modulation and coding schemes and an index value for an entry in the selected set of modulation and coding scheme, where the indication is based on the priority indicator and a network condition. The operations of 1315 may be performed according to the methods described herein. In some examples, aspects of the operations of 1315 may be performed by a control information component as described with reference to FIGS. 5 through 8.

At 1320, the UE may identify a combination of a modulation order and a code rate for the downlink transmission based on the indication and index value. The operations of 1320 may be performed according to the methods described herein. In some examples, aspects of the operations of 1320 may be performed by a modulation order and code rate component as described with reference to FIGS. 5 through 8.

Figure 14:
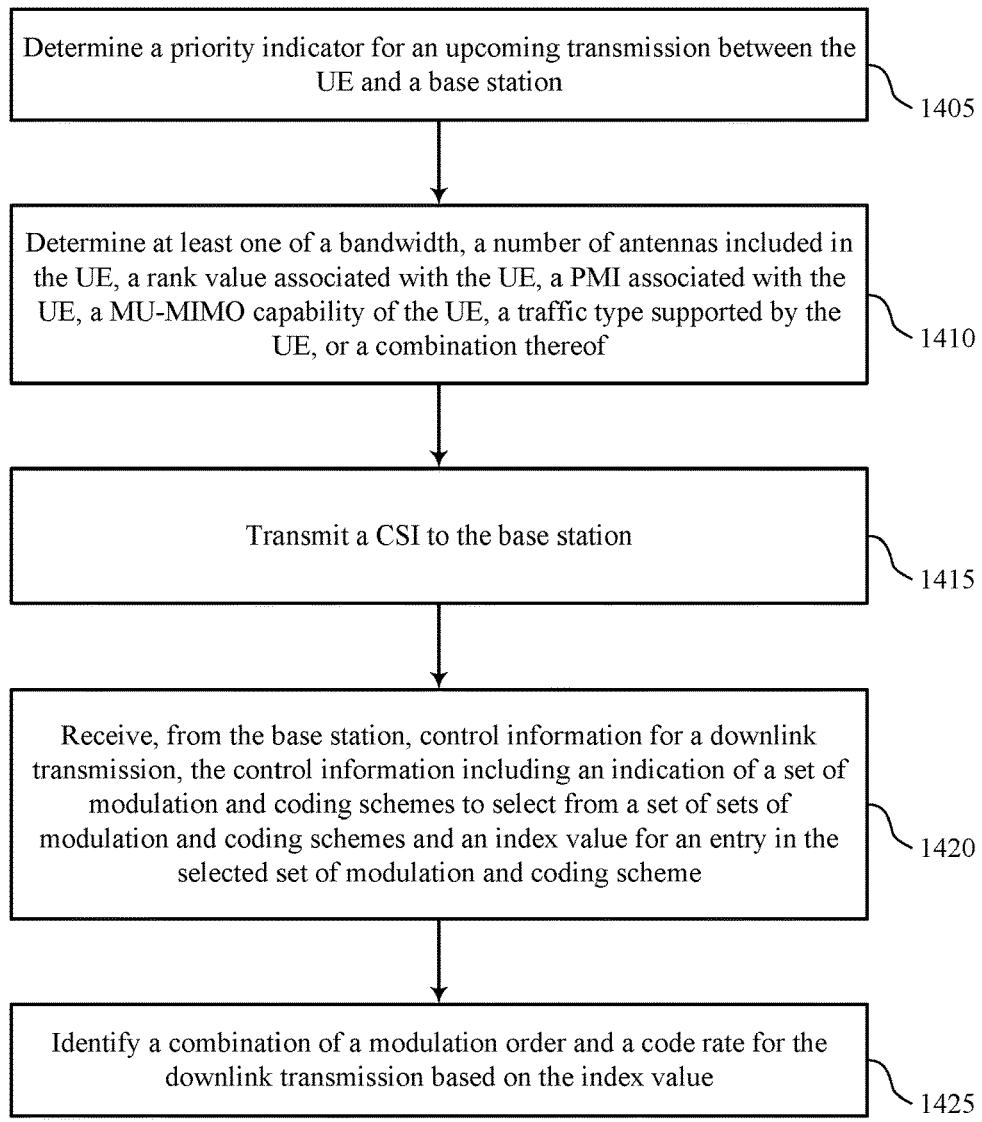

FIG. 14 shows a flowchart illustrating a method 1400 that supports modulation and coding scheme table design for power efficiency in accordance with one or more aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may determine a priority indicator for an upcoming transmission between the UE and a base station. The operations of 1405 may be performed according to the methods described herein. In some examples, aspects of the operations of 1405 may be performed by a priority component as described with reference to FIGS. 5 through 8.

At 1410, the UE may determine at least one of a bandwidth, a number of antennas included in the UE, a rank value associated with the UE, a PMI associated with the UE, a MU-MIMO capability of the UE, a traffic type supported by the UE, or a combination thereof. The operations of 1410 may be performed according to the methods described herein. In some examples, aspects of the operations of 1410 may be performed by a parameter component as described with reference to FIGS. 5 through 8.

At 1415, the UE may transmit a CSI to the base station. In some cases, the CSI may include at least one of the bandwidth, priority indicator, the number of antennas, the rank value, the PMI, the MU-MIMO capability of the UE, the traffic type, or a combination thereof. The operations of 1415 may be performed according to the methods described herein. In some examples, aspects of the operations of 1415 may be performed by a channel state information component as described with reference to FIGS. 5 through 8.

At 1420, the UE may receive, from the base station, control information for a downlink transmission, the control information including an indication of a set of modulation and coding schemes to select from a plurality of sets of modulation and coding schemes and an index value for an entry in the selected set of modulation and coding scheme. In some cases, the indication is based on the priority indicator and a network condition. The operations of 1420 may be performed according to the methods described herein. In some examples, aspects of the operations of 1440 may be performed by a control information component as described with reference to FIGS. 5 through 8.

At 1425, the UE may identify a combination of a modulation order and a code rate for the downlink transmission based on the index value. The operations of 1425 may be performed according to the methods described herein. In some examples, aspects of the operations of 1425 may be performed by a modulation order and code rate component as described with reference to FIGS. 5 through 8.

Figure 15:
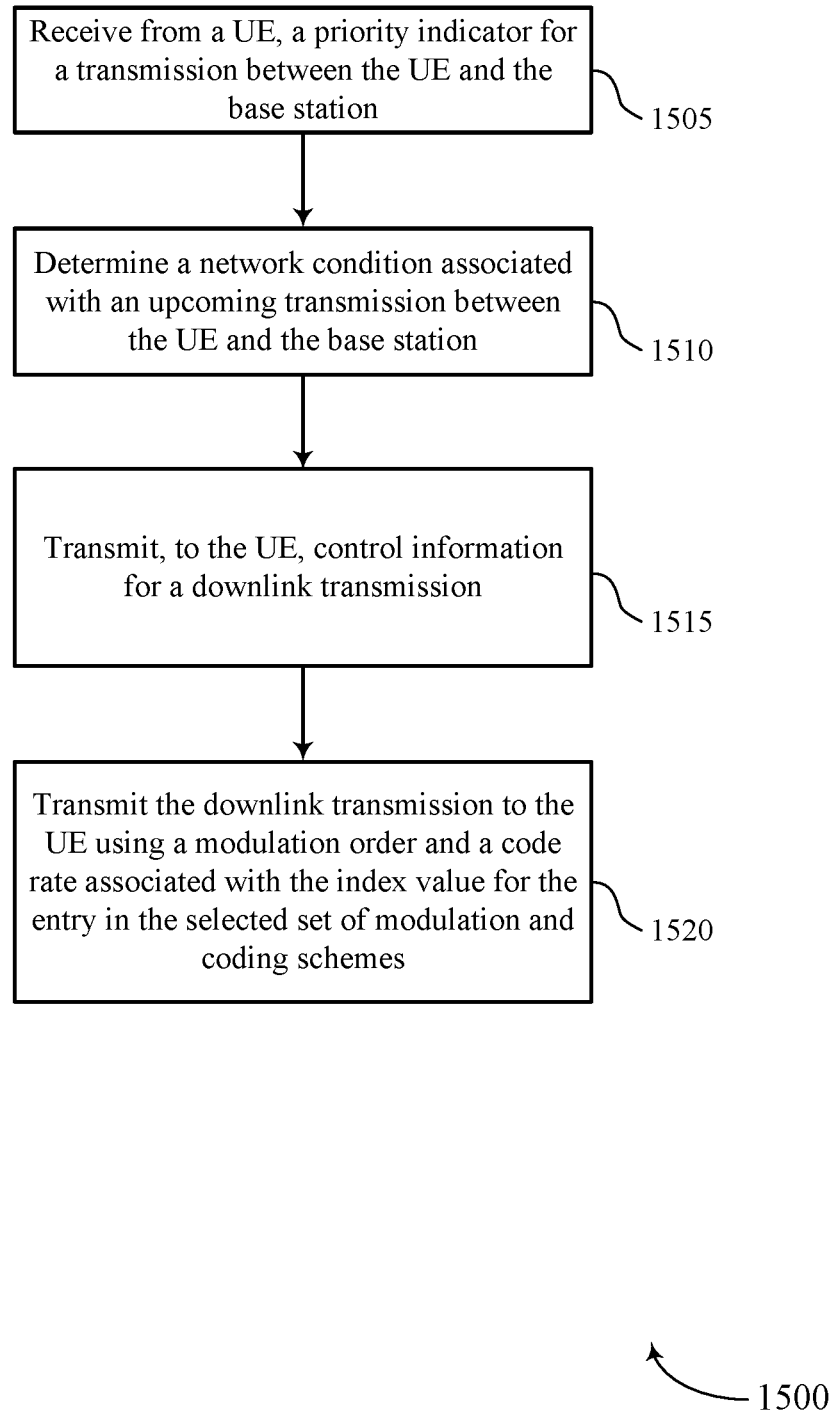

FIG. 15 shows a flowchart illustrating a method 1500 that supports modulation and coding scheme table design for power efficiency in accordance with one or more aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1505, the base station may receive from a UE, a priority indicator for a transmission between the UE and the base station. The operations of 1505 may be performed according to the methods described herein. In some examples, aspects of the operations of 1505 may be performed by a priority component as described with reference to FIGS. 9 through 12.

At 1510, the base station may determine a network condition associated with an upcoming transmission between the UE and the base station. The operations of 1510 may be performed according to the methods described herein. In some examples, aspects of the operations of 1510 may be performed by a network condition component as described with reference to FIGS. 9 through 12.

At 1515, the base station may transmit, to the UE, control information for a downlink transmission. In some cases, the control information may include an indication of a set of modulation and coding schemes for the UE to use from a plurality of sets of modulation and coding schemes and an index value for an entry in the selected set of modulation and coding schemes, where the indication is based on the priority indicator and a network condition. The operations of 1515 may be performed according to the methods described herein. In some examples, aspects of the operations of 1515 may be performed by a control information component as described with reference to FIGS. 9 through 12.

At 1520, the base station may transmit the downlink transmission to the UE using a modulation order and a code rate associated with the index value for the entry in the selected set of modulation and coding schemes. The operations of 1520 may be performed according to the methods described herein. In some examples, aspects of the operations of 1520 may be performed by a downlink transmission component as described with reference to FIGS. 9 through 12.

Figure 16:
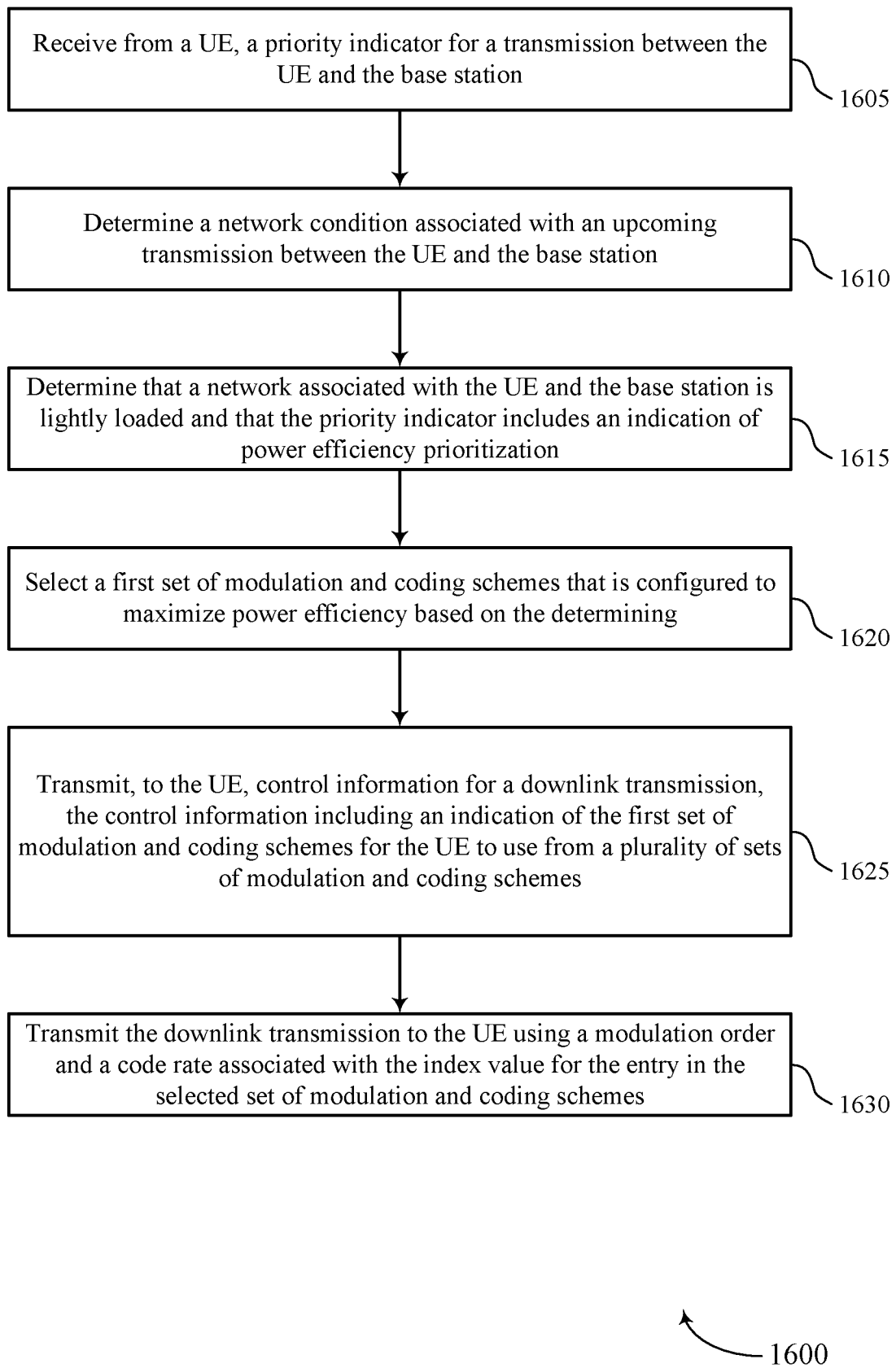

FIG. 16 shows a flowchart illustrating a method 1600 that supports modulation and coding scheme table design for power efficiency in accordance with one or more aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may receive from a UE, a priority indicator for a transmission between the UE and the base station. The operations of 1605 may be performed according to the methods described herein. In some examples, aspects of the operations of 1605 may be performed by a priority component as described with reference to FIGS. 9 through 12.

At 1610, the base station may determine a network condition associated with an upcoming transmission between the UE and the base station. The operations of 1610 may be performed according to the methods described herein. In some examples, aspects of the operations of 1610 may be performed by a network condition component as described with reference to FIGS. 9 through 12.

At 1615, the base station may determine that a network associated with the UE and the base station is lightly loaded and that the priority indicator includes an indication of power efficiency prioritization. The operations of 1615 may be performed according to the methods described herein. In some examples, aspects of the operations of 1615 may be performed by a network condition component as described with reference to FIGS. 9 through 12.

At 1620, the base station may select a first set of modulation and coding schemes that is configured to maximize power efficiency based on the determining. In some cases, the first set of modulation and coding schemes in the plurality of sets of modulation and coding schemes is configured to maximize power efficiency and a second set of modulation and coding schemes in the plurality of sets of modulation and coding schemes is configured to maximize spectral efficiency. The operations of 1620 may be performed according to the methods described herein. In some examples, aspects of the operations of 1620 may be performed by a control information component as described with reference to FIGS. 9 through 12.

At 1625, the base station may transmit, to the UE, control information for a downlink transmission, the control information including an indication of the first set of modulation and coding schemes for the UE to use from a plurality of sets of modulation and coding schemes and an index value for an entry in the selected set of modulation and coding schemes. In some cases, the indication is based on the priority indicator and a network condition. The operations of 1625 may be performed according to the methods described herein. In some examples, aspects of the operations of 1625 may be performed by a control information component as described with reference to FIGS. 9 through 12.

At 1630, the base station may transmit the downlink transmission to the UE using a modulation order and a code rate associated with the index value for the entry in the selected set of modulation and coding schemes. The operations of 1630 may be performed according to the methods described herein. In some examples, aspects of the operations of 1630 may be performed by a downlink transmission component as described with reference to FIGS. 9 through 12.

It should be noted that the methods described herein describe possible implementations, and that the operations and the operations may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative operations and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    determining a priority indicator for an upcoming transmission between the UE and a base station, wherein the priority indicator comprises an indication of a prioritization of power efficiency at the UE or a prioritization of spectral efficiency at the UE;
    transmitting the priority indicator to the base station;
    receiving, from the base station, control information for a downlink transmission, the control information including an indication of a set of modulation and coding schemes to select from a plurality of sets of modulation and coding schemes and an index value for an entry in the selected set of modulation and coding schemes, wherein the indication of the set of modulation and coding schemes indicates a first set of modulation and coding schemes from the plurality of sets of modulation and coding schemes based at least in part on the transmitted priority indicator indicating the prioritization of power efficiency and a network condition or a second set of modulation and coding schemes from the plurality of sets of modulation and coding schemes based at least in part on the transmitted priority indicator indicating the prioritization of spectral efficiency and the network condition; and identifying a combination of a modulation order and a code rate for the downlink transmission based at least in part on the index value.

2. The method of claim 1, wherein the priority indicator further indicates whether the UE prioritizes power efficiency over spectral efficiency at the UE.

3. The method of claim 1, wherein transmitting the priority indicator comprises:
identifying a channel quality indicator value included in a set of channel quality indicators, the set of channel quality indicators comprising combinations of modulation orders and code rates for a transmission between the UE and the base station;
determining a bandwidth associated with the transmission between the UE and the base station; and
transmitting a channel state information (CSI) to the base station, the CSI including the identified channel quality indicator value, the priority indicator, and the bandwidth associated with the transmission between the UE and the base station.

4. The method of claim 1, wherein transmitting the priority indicator further comprises:
determining at least one of a number of antennas included in the UE, a rank value associated with the UE, a pre-coding matrix indicator (PMI) associated with the UE, a multi-user multiple-input multiple-output (MU-MIMO) capability of the UE, a traffic type supported by the UE, or a combination thereof; and
transmitting a channel state information (CSI) to the base station, the CSI including at least one of the priority indicator, the number of antennas, the rank value, the PMI, the MU-MIMO capability of the UE, the traffic type, or a combination thereof.

5. The method of claim 1, wherein the index value identifies the entry from a plurality of available entries of the selected set of modulation and coding schemes.

6. The method of claim 1, wherein the network condition indicates whether a network associated with the UE and the base station is heavily loaded or lightly loaded.

7. The method of claim 1, further comprising:
receiving the downlink transmission from the base station; and
decoding the downlink transmission based at least in part on the identified combination of the modulation order and the code rate.

8. The method of claim 1, further comprising:
determining a channel quality for a transmission between the UE and the base station;
requesting a modulation order and a code rate using a channel quality indicator value, the requested modulation order and code rate being based on the channel quality; and
processing the control information to determine the modulation order, the code rate, or both from the base station.

9. The method of claim 1, wherein the modulation order comprises at least of a quadrature phase shift keying (QPSK) modulation, a 16 quadrature amplitude modulation (QAM), a 64 QAM, or a combination thereof.

10. The method of claim 1, wherein the first set of modulation and coding schemes from the plurality of sets of modulation and coding schemes is configured to maximize power efficiency and the second set of modulation and coding schemes from the plurality of sets of modulation and coding schemes is configured to maximize spectral efficiency.

11. The method of claim 10, wherein the first set of modulation and coding schemes comprises more entries with high modulation order and low coding rate than the second set of modulation and coding schemes.

12. The method of claim 1, further comprising:
receiving a downlink control indicator (DCI) from the base station; and
identifying the index value for the entry in the selected set of modulation and coding schemes based at least in part on a bit included in the DCI.

13. The method of claim 1, further comprising:
transmitting a radio resource control (RRC) connection setup request to the base station;
receiving an RRC connection setup response from the base station; and
identifying the index value for the entry in the selected set of modulation and coding schemes based at least in part on the RRC connection setup response.

14. The method of claim 1, further comprising:
receiving a radio network temporary identifier (RNTI) from the base station; and
identifying the index value for the entry in the selected set of modulation and coding schemes based at least in part on the received RNTI.

15. A method for wireless communication at a base station, comprising:
receiving from a user equipment (UE), a priority indicator for a transmission between the UE and the base station, wherein the priority indicator comprises an indication of a prioritization of power efficiency at the UE or a prioritization of spectral efficiency at the UE;
determining a network condition associated with an upcoming transmission between the UE and the base station;
transmitting, to the UE, control information for a downlink transmission, the control information including an indication of a set of modulation and coding schemes for the UE to select from a plurality of sets of modulation and coding schemes and an index value for an entry in the selected set of modulation and coding schemes, wherein the indication of the set of modulation and coding schemes indicates a first set of modulation and coding schemes from the plurality of sets of modulation and coding schemes based at least in part on the received priority indicator indicating the prioritization of power efficiency and the network condition or a second set of modulation and coding schemes from the plurality of sets of modulation and coding schemes based at least in part on the received priority indicator indicating the prioritization of spectral efficiency and the network condition; and
transmitting the downlink transmission to the UE using a modulation order and a code rate associated with the index value for the entry in the selected set of modulation and coding schemes.

16. The method of claim 15, wherein the priority indicator further indicates whether the UE prioritizes power efficiency over spectral efficiency at the UE.

17. The method of claim 15, wherein receiving the priority indicator comprises:
receiving a channel quality indicator value from the UE, the channel quality indicator value being included in a set of channel quality indicators that comprises combinations of modulation orders and code rates for a transmission between the UE and the base station; and
receiving a channel state information (CSI) from the UE, the CSI including the identified channel quality indicator value, the priority indicator, and a bandwidth associated with the transmission between the UE and the base station.

18. The method of claim 15, wherein receiving the priority indicator further comprises:
receiving a channel state information (CSI) from the UE, the CSI including at least one of a channel quality indicator value, the priority indicator, a number of antennas included in the UE, a rank value associated with the UE, a pre-coding matrix indicator (PMI) associated with the UE, a multi-user multiple-input multiple-output (MU-MIMO) capability of the UE and a traffic type supported by the UE.

19. The method of claim 15, wherein the index value identifies the entry from a plurality of available entries of the selected set of modulation and coding schemes.

20. The method of claim 15, wherein the network condition indicates whether a network associated with the UE and the base station is heavily loaded or lightly loaded.

21. The method of claim 15, further comprising:
receiving a request for a modulation order and a code rate from the UE, the requested modulation order and code rate being based on a channel quality associated with the UE; and
determining that a network associated with the UE and the base station is heavily loaded, wherein the transmitted modulation order is greater than the requested modulation order and the transmitted code rate is less than the requested code rate.

22. The method of claim 15, wherein the modulation order comprises at least one of a quadrature phase shift keying (QPSK) modulation, a 16 quadrature amplitude modulation (QAM), and a 64 QAM.

23. The method of claim 15, wherein the first set of modulation and coding schemes from the plurality of sets of modulation and coding schemes is configured to maximize power efficiency and the second set of modulation and coding schemes from the plurality of sets of modulation and coding schemes is configured to maximize spectral efficiency.

24. The method of claim 23, wherein the first set of modulation and coding schemes comprises more entries with high modulation order and low coding rate than the second set of modulation and coding schemes.

25. The method of claim 23, further comprising:
determining that a network associated with the UE and the base station is lightly loaded and that the priority indicator indicates the prioritization of power efficiency; and
selecting the first set of modulation and coding schemes that is configured to maximize power efficiency based at least in part on the determining.

26. The method of claim 23, further comprising:
determining that a network associated with the UE and the base station is heavily loaded and that the priority indicator indicates the prioritization of power efficiency; and
selecting the second set of modulation and coding schemes that is configured to maximize spectral efficiency based at least in part on the determining.

27. An apparatus for wireless communication, comprising:
a processor;
memory coupled to the processor, the processor and the memory configured to:
determine a priority indicator for an upcoming transmission between a UE and a base station, wherein the priority indicator comprises an indication of a prioritization of power efficiency at the UE or a prioritization of spectral efficiency at the UE;
transmit the priority indicator to the base station;
receive, from the base station, control information for a downlink transmission, the control information including an indication of a set of modulation and coding schemes to select from a plurality of sets of modulation and coding schemes and an index value for an entry in the selected set of modulation and coding scheme, wherein the indication of the set of modulation and coding schemes indicates a first set of modulation and coding schemes from the plurality of sets of modulation and coding schemes based at least in part on the transmitted priority indicator indicating the prioritization of power efficiency and a network condition or a second set of modulation and coding schemes from the plurality of sets of modulation and coding schemes based at least in part on the transmitted priority indicator indicating the prioritization of spectral efficiency and the network condition; and
identify a combination of a modulation order and a code rate for the downlink transmission based at least in part on the index value.

28. The apparatus of claim 27, wherein the priority indicator further indicates whether the UE prioritizes power efficiency over spectral efficiency at the UE.

29. An apparatus for wireless communication, comprising:
a processor;
memory coupled to the processor, the processor and the memory configured to:
receive from a user equipment (UE), a priority indicator for a transmission between the UE and a base station, wherein the priority indicator comprises an indication of a prioritization of power efficiency at the UE or a prioritization of spectral efficiency at the UE;
determine a network condition associated with an upcoming transmission between the UE and the base station;
transmit, to the UE, control information for a downlink transmission, the control information including an indication of a set of modulation and coding schemes for the UE to select from a plurality of sets of modulation and coding schemes and an index value for an entry in the selected set of modulation and coding schemes, wherein the indication of the set of modulation and coding schemes indicates a first set of modulation and coding schemes from the plurality of sets of modulation and coding schemes based at least in part on the received priority indicator indicating the prioritization of power efficiency and the network condition or a second set of modulation and coding schemes from the plurality of sets of modulation and coding schemes based at least in part on the received priority indicator indicating the prioritization of spectral efficiency and the network condition; and
transmit the downlink transmission to the UE using a modulation order and a code rate associated with the index value for the entry in the selected set of modulation and coding schemes.

* * * * *